(12) United States Patent
Nagaoka

(10) Patent No.: US 10,714,942 B2
(45) Date of Patent: Jul. 14, 2020

(54) POWER TRANSMITTER AND WIRELESS POWER TRANSFER SYSTEM

(71) Applicant: IHI CORPORATION, Tokyo (JP)

(72) Inventor: Shiro Nagaoka, Tokyo (JP)

(73) Assignee: IHI CORPORATION, Tokyo (JP)

( * ) Notice: Subject to any disclaimer, the term of this patent is extended or adjusted under 35 U.S.C. 154(b) by 78 days.

(21) Appl. No.: 15/755,858

(22) PCT Filed: Sep. 6, 2016

(86) PCT No.: PCT/JP2016/076186
§ 371 (c)(1),
(2) Date: Feb. 27, 2018

(87) PCT Pub. No.: WO2017/047454
PCT Pub. Date: Mar. 23, 2017

(65) Prior Publication Data
US 2018/0342878 A1 Nov. 29, 2018

(30) Foreign Application Priority Data

Sep. 17, 2015 (JP) .................. 2015-184051
Sep. 29, 2015 (JP) .................. 2015-190956

(51) Int. Cl.
*H02J 5/00* (2016.01)
*H02J 50/80* (2016.01)
(Continued)

(52) U.S. Cl.
CPC ............... *H02J 5/00* (2013.01); *H02J 7/025* (2013.01); *H02J 50/12* (2016.02); *H02J 50/80* (2016.02);
(Continued)

(58) Field of Classification Search
CPC .... H02J 5/00; H02J 5/005; H02J 50/12; H02J 50/10; H02J 50/60; H02J 50/80;
(Continued)

(56) References Cited

U.S. PATENT DOCUMENTS 8,947,041 B2 * 2/2015 Cook ..................... H02J 50/00
320/108
2010/0225173 A1 9/2010 Aoyama
(Continued)

FOREIGN PATENT DOCUMENTS

EP 0905856 A1 3/1999
EP 2822147 A1 1/2015
(Continued)

OTHER PUBLICATIONS

International Search Report mailed in corresponding International Patent Application No. PCT/JP2016/076186 dated Dec. 6, 2016, consisting of 5 pp. (English Translation Provided).

*Primary Examiner* — Rexford N Barnie
*Assistant Examiner* — Jagdeep S Dhillon
(74) *Attorney, Agent, or Firm* — Volpe and Koenig, P.C.

(57) ABSTRACT

A power transmitter according to an aspect of the present disclosure includes a first coil to wirelessly transmit power to a second coil of a power receiver; a converter to receive direct current (DC) power, convert the DC power into alternating current (AC) power, and supply the AC power to the first coil; and a controller to execute power control for causing power supplied to a load to approach desired power. The controller executes frequency control of the AC power and at least one control of phase shift control of the converter and voltage control of the DC power as the power control. When the power supplied to the load cannot be caused to approach the desired power by the frequency
(Continued)

control, the controller executes at least one of the phase shift control and the voltage control.

19 Claims, 17 Drawing Sheets

(51) Int. Cl.
    *H02J 50/12*     (2016.01)
    *B60L 5/00*     (2006.01)
    *B60M 7/00*     (2006.01)
    *B60L 50/50*     (2019.01)
    *H02J 7/02*     (2016.01)

(52) U.S. Cl.
    CPC ............ *B60L 5/00* (2013.01); *B60L 50/50* (2019.02); *B60M 7/00* (2013.01); *Y02T 10/7005* (2013.01)

(58) Field of Classification Search
    CPC .... H02J 50/90; H02J 50/40; H02J 7/02; H02J 7/04; H02J 7/025; H02J 7/0068; B60L 5/00; H01F 38/14; G01V 3/10; H02M 3/335; H02M 3/337
    USPC ............... 307/104, 9.1, 149; 320/107, 108
    See application file for complete search history.

(56) References Cited

U.S. PATENT DOCUMENTS

| | | | |
|---|---|---|---|
| 2011/0227420 A1 | 9/2011 | Urano | |
| 2013/0188397 A1* | 7/2013 | Wu | H02M 7/53871 363/17 |
| 2014/0008969 A1 | 1/2014 | Kanahara | |
| 2014/0125139 A1 | 5/2014 | Wang | |
| 2014/0320090 A1* | 10/2014 | Keeling | H02J 50/70 320/162 |
| 2015/0108847 A1* | 4/2015 | Taylor | H02J 50/60 307/104 |
| 2015/0061580 A1 | 5/2015 | Yamakawa | |
| 2015/0207333 A1* | 7/2015 | Baarman | H02J 5/005 307/104 |
| 2015/0331135 A1* | 11/2015 | Widmer | G01V 3/101 324/234 |
| 2016/0308397 A1* | 10/2016 | Jung | H02J 50/12 |
| 2017/0005466 A1 | 1/2017 | Nakano | |
| 2017/0025895 A1 | 1/2017 | Hayashida | |
| 2017/0033591 A1* | 2/2017 | Govindaraj | B60L 53/122 |
| 2018/0294672 A1* | 10/2018 | Zhong | H02J 7/025 |

FOREIGN PATENT DOCUMENTS

| | | |
|---|---|---|
| JP | 2001-136667 A | 5/2001 |
| JP | 2010-213414 A | 9/2010 |
| JP | 2011-217596 A | 10/2011 |
| JP | 2012-130173 A | 7/2012 |
| JP | 2012-138976 A | 7/2012 |
| JP | 2012-191764 A | 10/2012 |
| JP | 2013-074685 A | 4/2013 |
| JP | 2013-183497 A | 9/2013 |
| JP | 2013-211933 A | 10/2013 |
| JP | 2013-212033 A | 10/2013 |
| JP | 2013-243788 A | 12/2013 |
| JP | 2013-252001 A | 12/2013 |
| JP | 2014-014225 A | 1/2014 |
| JP | 2014-093938 A | 5/2014 |
| JP | 2014-207795 A | 10/2014 |
| JP | 2015-012716 A | 1/2015 |
| JP | 2015-053794 A | 3/2015 |
| JP | 2015-089221 A | 5/2015 |
| JP | 2015-104141 A | 6/2015 |
| WO | 2013/128641 | 9/2013 |
| WO | 2015/115285 A1 | 8/2015 |

* cited by examiner

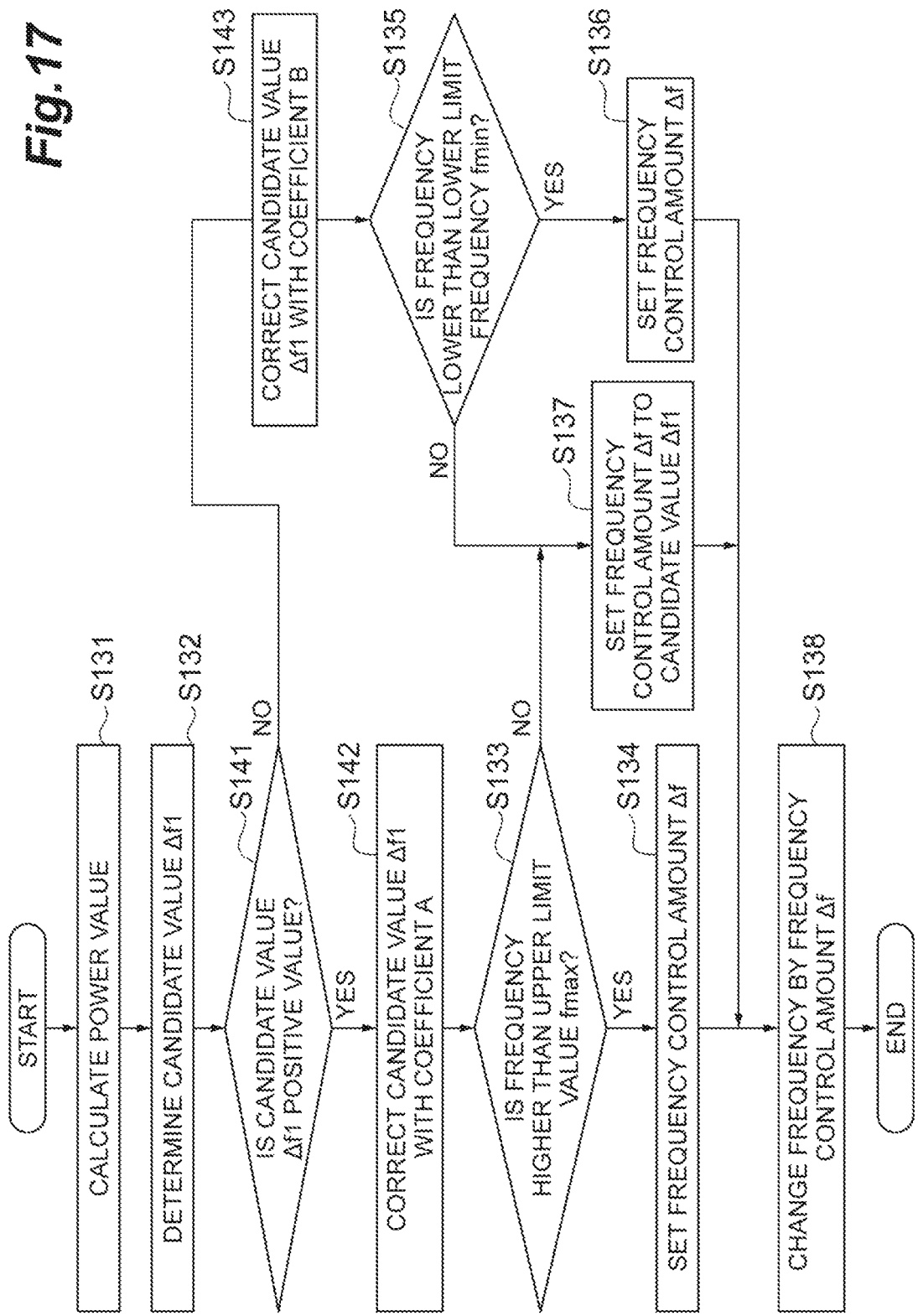

POWER TRANSMITTER AND WIRELESS POWER TRANSFER SYSTEM

TECHNICAL FIELD

The present disclosure relates to a power transmitter and a wireless power transfer system. The present application is based on Japanese Patent Application No. 2015-184051 filed on Sep. 17, 2015 and on Japanese Patent Application No. 2015-190956 filed on Sep. 29, 2015 and claims the benefit of priority thereto. The entire contents of these applications are incorporated herein by reference.

BACKGROUND ART

There has been known a wireless power transfer system that wirelessly transmits power from a power transmission coil of a power transmitter to a power reception coil of a power receiver and supplies the power to a load of a power receiver side. In the wireless power transfer system, relative positions of the power transmission coil and the power reception coil are misaligned, so that the power supplied to the power reception coil and the load changes.

For example, Patent Literature 1 discloses a method of adjusting a voltage generated in the power reception coil by performing frequency control of power supplied to the power transmission coil in the power transmitter, when the misalignment occurs.

CITATION LIST

Patent Literature

Patent Literature 1: Japanese Unexamined Patent Publication No. 2012-191764

SUMMARY

Technical Problem

In a power transmission system, there is a request to supply desired power to a load. However, if the relative positions of the power transmission coil and the power reception coil are misaligned, the power supplied to the load changes accordingly. Therefore, if the power supplied to the load changes due to the misalignment, it is assumed that a frequency of alternating current (AC) power supplied to the power transmission coil is controlled to suppress the change, as in the method of Patent Literature 1. However, because there is a limitation in power adjustment using only the frequency control, the power supplied to the load may not be caused to approach the desired power.

The present disclosure describes a power transmitter and a wireless power transfer system capable of causing power supplied to a load to approach desired power more surely.

Solution to Problem

A power transmitter according to an aspect of the present disclosure is a power transmitter for supplying power to a power receiver connected to a load, and the power transmitter includes: a first coil configured to wirelessly transmit the power to a second coil of the power receiver; a converter configured to receive direct current (DC) power, convert the DC power into AC power, and supply the AC power to the first coil; and a controller configured to execute power control for causing power supplied to the load to approach desired power. The controller executes frequency control of the AC power and at least one control of phase shift control of the converter and voltage control of the DC power as the power control. When the power supplied to the load cannot be caused to approach the desired power by the frequency control, the controller executes at least one of the phase shift control and the voltage control.

Advantageous Effects

According to the present disclosure, power supplied to a load can be caused to approach desired power more surely.

BRIEF DESCRIPTION OF DRAWINGS

FIG. 17 is a flowchart illustrating another example of processing executed in the power transmitter according to the second embodiment.

DESCRIPTION OF EMBODIMENTS

[1] Outline of Embodiments

Figure 1:
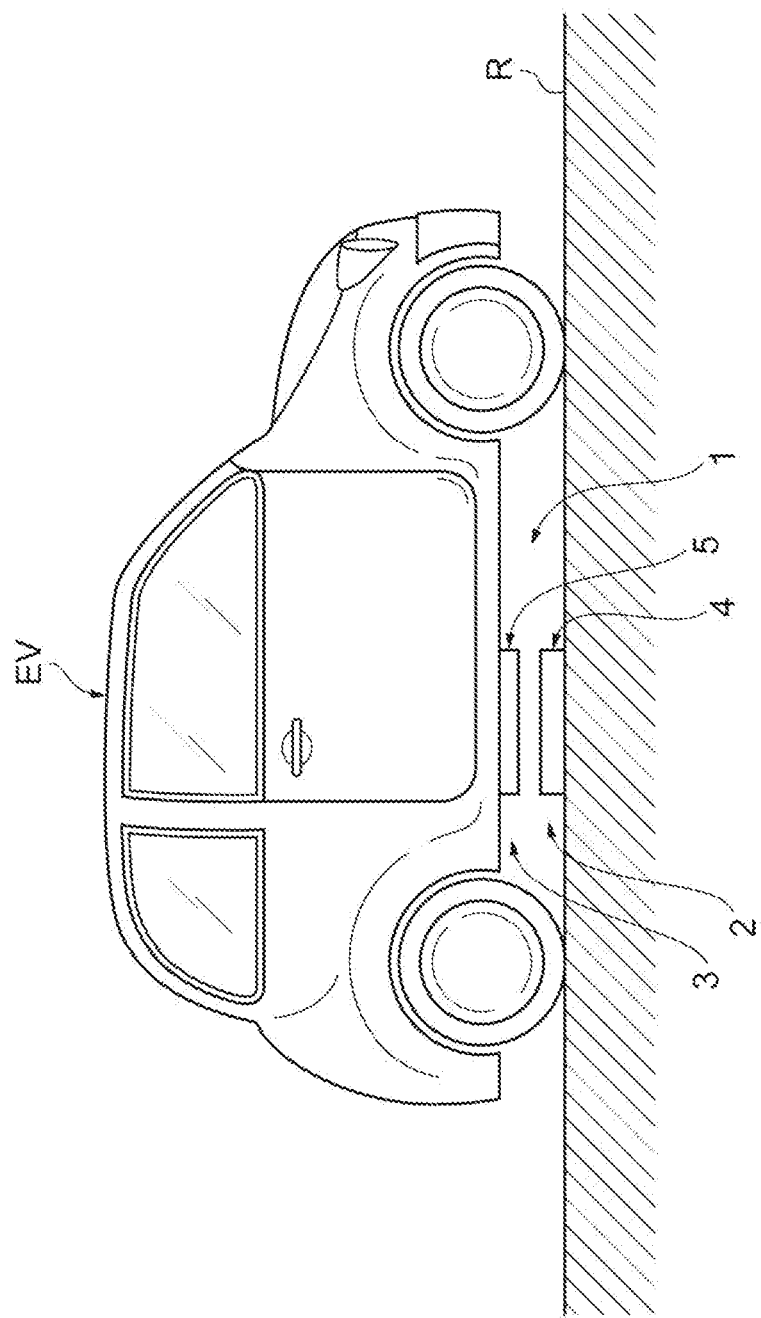
FIG. 1 is a diagram illustrating an application example of a power transmitter and a wireless power transfer system according to an embodiment.

A power transmitter according to an aspect of the present disclosure is a power transmitter for supplying power to a power receiver connected to a load, and the power transmitter includes: a first coil configured to wirelessly transmit the power to a second coil of the power receiver; a converter configured to receive DC power, convert the DC power into AC power, and supply the AC power to the first coil; and a controller configured to execute power control for causing power supplied to the load to approach desired power. The controller executes frequency control of the AC power and at least one control of phase shift control of the converter and voltage control of the DC power as the power control. When the power supplied to the load cannot be caused to approach the desired power by the frequency control, the controller executes at least one of the phase shift control and the voltage control.

According to the power transmitter, in addition to the frequency control, any control of the phase shift control and the voltage control is executed. When only the frequency control is executed, there is a limitation in power adjustment, because a power adjustment range is limited and fine power adjustment cannot be performed. In the power transmitter, when the power supplied to the load cannot be caused to approach the desired power by the frequency control, at least one of the phase shift control and the voltage control is executed. As such, by executing at least one of the phase shift control and the power control in addition to the frequency control, the power adjustment range is widened and the power adjustment is performed more finely, as compared with the case where only the frequency control is executed. Therefore, the power supplied to the load can be caused to further approach the desired power.

The controller may execute the frequency control and the phase shift control as the power control and the controller may execute the phase shift control when the power supplied to the load cannot be caused to approach the desired power by the frequency control. The phase shift control is superior to the voltage control in responsiveness. Therefore, in the case where the phase shift control is executed when the power supplied to the load cannot be caused to approach the desired power by the frequency control rather than the case where the voltage control is executed when the power supplied to the load cannot be caused to approach the desired power by the frequency control, the responsiveness of the power control can be improved and the power adjustment can be easily performed.

The controller may further execute the voltage control and the controller may further execute the voltage control when the power supplied to the load cannot be caused to approach the desired power by the phase shift control. As a result, as compared with the case where only the two controls of the frequency control and the phase shift control are performed, the power adjustment range is further widened and the power adjustment is performed more finely. Therefore, the power supplied to the load can be caused to further approach the desired power.

The controller may further switch a voltage of the DC power according to a power command value corresponding to the desired power. For example, a voltage of the DC power is switched such that the power command value is included in an adjustment range of the power control by the frequency control and the phase shift control, so that the power supplied to the load is easily caused to approach the desired power.

When a difference between a power command value corresponding to the desired power and the power supplied to the load is larger than a predetermined error allowance value, the controller may determine that the power supplied to the load cannot be caused to approach the desired power. In this case, the power control can be executed with desired accuracy, according to the error allowance value.

A current phase of the AC power may be more delayed than a voltage phase of the AC power and the controller may execute the power control such that the magnitude of a phase difference of the current phase with respect to the voltage phase does not fall below a predetermined value in the phase shift control. As a result, because the phase difference of the predetermined value or more is secured, it is possible to execute the power control while securing stability of the supply of the AC power from the converter to the first coil.

A wireless power transfer system according to another aspect of the present disclosure includes the power transmitter and the power receiver configured to perform communication with the power transmitter. The power receiver includes a detector configured to detect power supplied to the load and the controller executes the power control such that the power detected by the detector approaches the desired power.

According to the wireless power transfer system, because the power transmitter described above is included, it is possible to cause the power supplied to the load to further approach the desired power as compared with the case where the only the frequency control is executed. In addition, the power supplied to the load is detected using the detector of the power receiver and the power control is executed in the power transmitter using a detection result thereof. In this case, accuracy of the power control can be improved as compared with the case where the power control is executed by estimating the power supplied to the load at the power transmitter side, for example.

A power transmitter according to another aspect of the present disclosure is a power transmitter for supplying power to a power receiver connected to a load. The power transmitter includes a first coil configured to wirelessly transmit the power to a second coil of the power receiver; a converter configured to receive power, convert the power into AC power, and supply the converted AC power to the first coil; and a controller to change a parameter for controlling the AC power. The controller changes the parameter such that power supplied to the load approaches desired power, based on a power change rate indicating a change amount of the power supplied to the load with respect to a predetermined change amount of the parameter from a reference value.

In the power transmitter, the parameter is changed such that power supplied to the load approaches the desired power, based on the power change rate indicating the change amount of the power supplied to the load with respect to the predetermined change amount of the parameter from the reference value. As such, because the parameter is changed on the basis of the power change rate, the power supplied to the load can be adjusted to approach the desired power without detecting a misalignment.

The controller may store the power change rate. As a result, for example, it is unnecessary to obtain the power change rate in real time, so that it is possible to improve the responsiveness of the adjustment of the power supplied to the load.

The controller may acquire the power change rate from the outside of the power transmitter. For example, the power change rate is acquired by receiving the power change rate transmitted from another device (for example, a movable object such as a vehicle) provided with the power receiver. In this case, because the movable object such as the vehicle transmitting the power change rate identifies a characteristic of the power receiver, the power change rate corresponding to the power receiver is acquired. As a result, the power supplied to the load is adjusted on the basis of an appropriate power change rate. Therefore, even when power is supplied to the power receivers having different types and characteristics, it is possible to appropriately adjust the power supplied to the load.

The controller may change the parameter based on a difference between the power supplied to the load and the desired power and the power change rate. In this case, for example, the parameter is changed by an amount according to the difference between the power supplied to the load and the desired power, so that the power supplied to the load can be caused to approach the desired power.

The parameter may be a frequency of the AC power and the reference value may be a reference frequency determined with respect to the frequency of the AC power. That is, the controller may change the parameter such that the power supplied to the load approaches the desired power, based on a power change rate of the power supplied to the load with respect to a predetermined frequency change amount of the frequency of the AC power from the reference frequency. As such, the parameter is set to the frequency of the AC power, so that the power supplied to the load can be adjusted to approach the desired power without detecting the misalignment.

The power change rate may be set for each of the different reference frequencies and the controller may change the frequency of the AC power such that the power supplied to the load approaches the desired power, based on the power change rate with the frequency of the AC power supplied to the first coil as the reference frequency. As a result, even when the power change rate is different according to the reference frequency, the change of the parameter based on the appropriate power change rate corresponding to the frequency of the AC power supplied to the first coil is enabled. Therefore, adjustment accuracy of the power supplied to the load can be improved.

When the different reference frequencies are arranged in ascending order or descending order, an interval between the adjacent reference frequencies may be set to be larger when a change amount of the power change rate with respect to the frequency of the AC power is smaller. For example, if the individual reference frequencies are set at equal intervals at frequency intervals at which an appropriate resolution with respect to the change amount of the power change rate is obtained with a region where the change amount of the power change rate is large as a reference, the resolution with respect to the power change amount becomes excessively fine in a region where the change amount of the power change rate is small. In this case, because the number of reference frequencies, that is, the number of corresponding power change rates becomes excessively large, an amount of data to be handled becomes unnecessarily large correspondingly. On the other hand, if the individual reference frequencies are set at equal intervals at frequency intervals at which an appropriate resolution with respect to the change amount of the power change rate is obtained with a region where the change amount of the power change rate is small as a reference, the resolution with respect to the power change amount becomes coarse in a region where the change amount of the power change rate is large. In this case, there is a possibility that adjustment accuracy of the power cannot be sufficiently improved. According to the above configuration, the interval between the adjacent reference frequencies is set to be larger when the change amount of the power change rate is smaller. Therefore, in the region where the change amount of the power change rate is small, the frequency interval is set such that the resolution with respect to the change amount of the power change rate does not become excessively fine and the data amount is suppressed. In addition, in the region where the change amount of the power change rate is large, the frequency interval is set such that the resolution with respect to the change amount of the power change rate does not become excessively coarse. Therefore, it is possible to maintain adjustment accuracy of the power supplied to the load while reducing the amount of data to be handled.

The power change rate may be set for each different voltage range of the power supplied to the load and the controller may change the parameter such that the power supplied to the load approaches the desired power, based on a power change rate corresponding to a voltage range including a voltage of the power supplied to the load. As a result, even when the power change rate is different according to the voltage range of the power supplied to the load, a change in the parameter based on an appropriate power change rate corresponding to the voltage of the power supplied to the load is enabled. Therefore, the adjustment accuracy of the power supplied to the load can be improved.

The controller may calculate a control amount of the parameter, based on a difference between the power supplied to the load and the desired power and the power change rate. When the power supplied to the load is increased, the controller may perform correction such that the magnitude of the calculated control amount of the parameter decreases and change the parameter by the control amount of the parameter after the correction. As a result, it is possible to suppress occurrence of a situation where the power supplied to the load and the power flowing through the power transmitter or the like rapidly increase and it becomes difficult to realize stabilized adjustment of the power supplied to the load, for example.

The controller may estimate the power supplied to the load based on the AC power and change the parameter such that the estimated power approaches the desired power. As a result, because the power supplied to the load is estimated on the basis of the AC power supplied to the first coil, the power supplied to the load can be adjusted without adopting a configuration in which the power supplied to the load is detected at the power receiver side and a detection result is transmitted to the power transmitter side. Therefore, there is a high possibility that a configuration of the device is simplified and a cost of the device is reduced.

A wireless power transfer system according to another aspect of the present disclosure includes the power transmitter and the power receiver. The power receiver performs communication with the power transmitter, the power receiver includes a detector configured to detect the power supplied to the load, and the controller of the power transmitter changes the parameter such that the power detected by the detector of the power receiver approaches the desired power.

According to the wireless power transfer system, because the power transmitter described above is included, the power supplied to the load can be adjusted without detecting the misalignment of the first coil and the second coil. In addition, the power supplied to the load is detected using the detector of the power receiver and the controller of the power transmitter changes the parameter using a detection result thereof. Therefore, the adjustment accuracy of the power supplied to the load can be improved as compared with the case where the power supplied to the load is estimated on the basis of the AC power supplied to the first coil, for example.

[2] Exemplification of Embodiments

Hereinafter, embodiments of the present disclosure are described with reference to the drawings. In the description of the drawings, the same elements are denoted by the same reference numerals and redundant explanation is omitted.

FIG. 1 is a diagram illustrating an application example of a power transmitter and a wireless power transfer system according to an embodiment. As illustrated in FIG. 1, a wireless power transfer system 1 is a system that includes a power transmitter 2 and a power receiver 3 and supplies power from the power transmitter 2 to the power receiver 3. The power transmitter 2 and the power receiver 3 are separated from each other in a vertical direction, for example. The power transmitter 2 is installed in a parking lot or the like, for example. The power receiver 3 is mounted on an electric vehicle EV. The wireless power transfer system 1 is configured to supply power to the electric vehicle EV arriving at the parking lot or the like, using inter-coil magnetic coupling such as a magnetic field resonance method and an electromagnetic induction method. The power receiver 3 may be mounted on various movable objects such as a plug-in hybrid vehicle and an underwater vehicle, instead of the electric vehicle EV.

The power transmitter 2 is a device that supplies power for wireless power transfer. The power transmitter 2 generates desired AC power from power supplied by a power source PS (refer to FIG. 2) and transmits the AC power to the power receiver 3. The power transmitter 2 is installed on a road surface R such as the parking lot, for example. The power transmitter 2 includes a power transmission coil device 4 that is provided to protrude upward from the road surface R such as the parking lot, for example. The power transmission coil device 4 includes a first coil 21 (refer to FIG. 2) and has a shape of a flat frustum or a shape of a flat rectangular parallelepiped, for example. The power transmitter 2 generates desired AC power from an AC power source. The generated AC power is transmitted to the power transmission coil device 4 and the power transmission coil device 4 generates magnetic flux.

Figure 2:
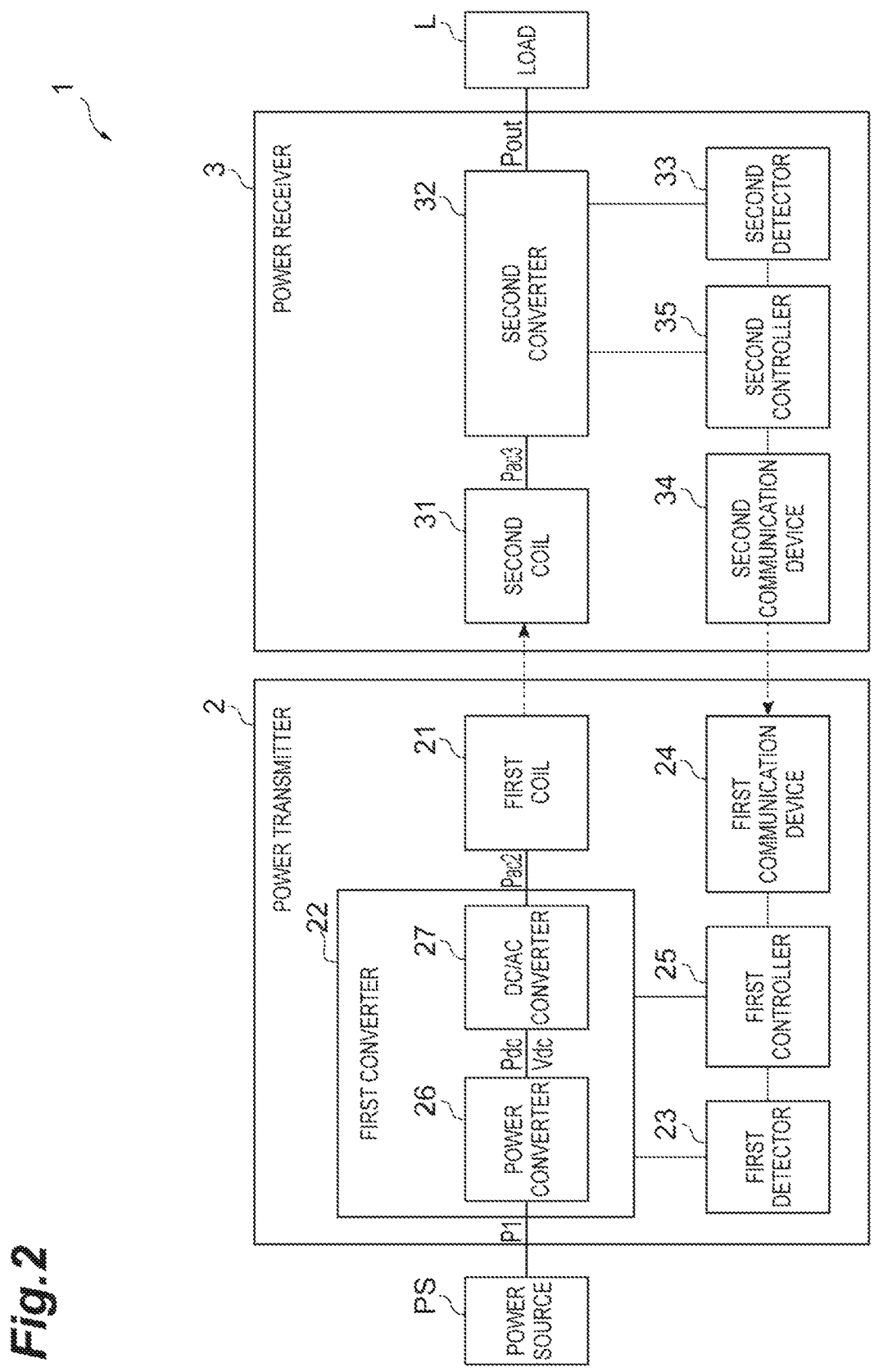
FIG. 2 is a circuit block diagram of the wireless power transfer system according to the embodiment.

The power receiver 3 is a device that receives power from the power transmitter 2 and supplies the power to a load L (refer to FIG. 2). The power receiver 3 is mounted on the electric vehicle EV, for example. The power receiver 3 includes a power reception coil device 5 attached to a bottom surface of a vehicle body (chassis or the like) of the electric vehicle EV, for example. The power reception coil device 5 includes a second coil 31 (refer to FIG. 2) and faces the power transmission coil device 4 in a state where the power reception coil device 5 and the power transmission coil device 4 are separated from each other in a vertical direction, at the time of supplying power. The power reception coil device 5 has a shape of a flat frustum or a shape of a flat rectangular parallelepiped, for example. The magnetic flux generated by the power transmission coil device 4 interlinks with the power reception coil device 5, so that the power reception coil device 5 generates an induced current. As a result, the power reception coil device 5 receives the power from the power transmission coil device 4 wirelessly. The power received by the power reception coil device 5 is supplied to the load.

With reference to FIG. 2, a circuit configuration of the wireless power transfer system 1 is described in detail. FIG. 2 is a circuit block diagram of the wireless power transfer system 1. As illustrated in FIG. 2, the wireless power transfer system 1 is a system for receiving input power P1 from the power source PS and supplying load power Pout to the load L. The power source PS may be an AC power source or may be a DC power source. A type of the AC power source is not particularly limited, but it may be a commercial power source, for example. A type of the DC power source is not particularly limited, but it may be a photovoltaic power generation device, a power storage device, or the like, for example. The load L may be a DC load or may be an AC load. A type of the DC load is not particularly limited, but it may be a storage battery, for example. A type of the AC load is not particularly limited, but it may be an electric motor, for example.

The power transmitter 2 is supplied with the input power P1 from the power source PS. The power transmitter 2 includes the first coil 21, a first converter 22, a first detector 23, a first communication device 24, and a first controller 25.

The first converter 22 is a circuit configured to convert the input power P1 supplied from the power source PS into desired AC power Pac2 and to supply the converted AC power Pac2 to the first coil 21. The first converter 22 includes a power converter 26 and a DC/AC converter 27.

As the power converter 26, for example, the following configuration can be adopted according to the input power P1. When the input power P1 is AC power, the power converter 26 may be an AC/DC converter, for example. The AC/DC converter is a rectifier circuit, for example. The rectifier circuit may be composed of a rectifying element such as a diode or may be composed of a switching element such as a transistor. The DC/AC converter may have a power factor correction (PFC) function and a step-up/step-down function.

When the input power P1 is DC power, the power converter 26 may be a DC/DC converter, for example. The DC/DC converter may be a non-insulation type circuit using a chopper circuit or an insulation type circuit using a transformer, for example.

Even in any case, the magnitude of DC power Pdc output from the power converter 26 is controlled by the first controller 25. The magnitude of the DC power Pdc is controlled by changing a DC voltage Vdc output from the power converter 26, for example. The power converter 26 supplies the converted DC power Pdc to the DC/AC converter 27.

The DC/AC converter 27 converts the DC power Pdc converted by the power converter 26 into the AC power Pac2. The DC/AC converter 27 is an inverter circuit, for example. The first converter 22 may further include a transformer provided at an output of the DC/AC converter 27. The magnitude of the AC power Pac2 output from the DC/AC converter 27 is controlled by the first controller 25. The magnitude of the AC power Pac2 can be controlled by frequency control and phase shift control, for example. The DC/AC converter 27 supplies the converted AC power Pac2 to the first coil 21.

The configuration of the first converter 22 is not limited to the example illustrated in FIG. 2. For example, the first converter 22 may include an AC/AC converter instead of the power converter 26 and the DC/AC converter 27. The AC/AC converter is a matrix converter, a cycloconverter, or the like, for example. In this case, the first converter 22 receives the AC power from the power source PS and converts the AC power into AC power. In addition, the power converter 26 may be composed of an AC/DC converter and a DC/DC converter provided at an output of the AC/DC converter.

The first coil 21 is a coil for wirelessly feeding the power to the power receiver 3. The first coil 21 generates a magnetic flux when the AC power Pac2 is supplied from the first converter 22. Between the first coil 21 and the first converter 22, a capacitor and an inductor (for example, a reactor) may be connected.

The first detector 23 includes a sensor to detect the magnitude of the DC power Pdc. The first detector 23 is a voltage sensor, a current sensor, or a combination thereof, for example.

The first communication device 24 is a circuit for performing wireless communication with a second communication device 34 of the power receiver 3 to be described below. The first communication device 24 is, for example, an antenna for a communication method using radio waves or a light-emitting element and a light-receiving element for a communication method using optical signals. The first communication device 24 outputs information received from the power receiver 3 to the first controller 25.

The first controller 25 is a processing device such as a central processing unit (CPU) and a digital signal processor (DSP). The first controller 25 may include a read only memory (ROM), a random access memory (RAM), an interface circuit for connection with each unit of the power transmitter 2, and the like. The first controller 25 executes power control to control the magnitude of the AC power Pac2 and control the magnitude of the load power Pout supplied to the load L, by controlling the first converter 22. As the power control, for example, on the basis of a measurement value and a power command value (to be described below) received (notified) from the power receiver 3 via the first communication device 24, the first controller 25 controls the first converter 22 such that the measurement value approaches the power command value. As described below, the first controller 25 may estimate the load power Pout, on the basis of the AC power Pac2 supplied from the first converter 22 to the first coil 21.

The power control is performed using at least one of the frequency control, the phase shift control, and the control of the DC power Pdc to be described below. In each control, a parameter to control the magnitude of the AC power Pac2 is changed.

The frequency control is described. The magnitudes of the AC power Pac2 and the load power Pout change according to a frequency of the AC power Pac2. As the frequency of the AC power Pac2, for example, 81.38 kHz to 90 kHz can be used. As the frequency changes, impedance of a reactance element such as the coil and the capacitor changes and the magnitudes of the AC power Pac2 and the load power Pout change. Hereinafter, in this embodiment, it is assumed that the magnitudes of the AC power Pac2 and the load power Pout decrease as the frequency increases. The first controller 25 performs the frequency control for changing the magnitudes of the AC power Pac2 and the load power Pout by changing the frequency of the AC power Pac2. The parameter in the frequency control is the frequency of the AC power Pac2. The frequency of the AC power Pac2 is a frequency of the AC current or the AC voltage output from the first converter 22.

A specific method of the frequency control is not limited. For example, when the DC/AC converter 27 is an inverter circuit, the first controller 25 adjusts a switching frequency of each switching element using a driving signal supplied to each switching element included in the inverter circuit and changes the frequency of the AC power Pac2. The switching element is, for example, a field effect transistor (FET), an insulated gate bipolar transistor (IGBT), or the like. In this case, the driving signal is applied to a gate of the switching element. The frequency control is described in detail below using FIG. 4.

Figure 3:
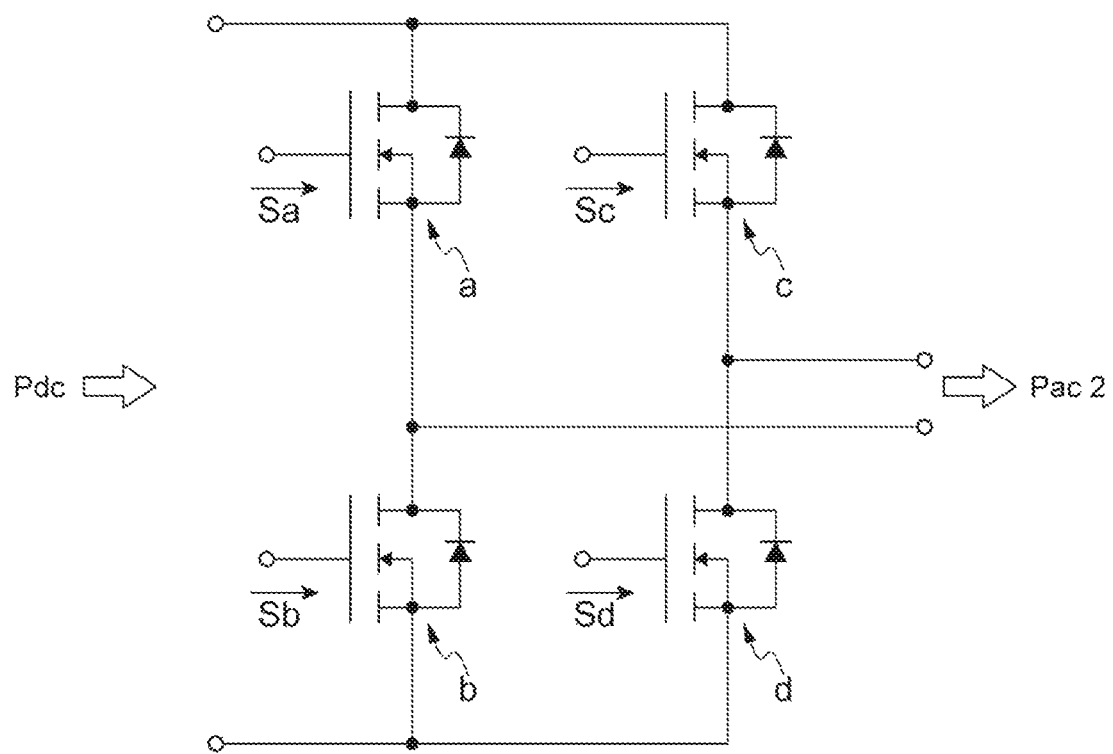
FIG. 3 is a diagram illustrating an example of a circuit configuration of a DC/AC converter.

The phase shift control is described. When the DC/AC converter 27 is the inverter circuit as illustrated in FIG. 3, the first controller 25 adjusts a time for which each of the switching elements a to d is turned on by adjusting supply times of driving signals Sa to Sd for switching elements a to d included in the inverter circuit. When a driving time of the switching element a and a driving time of the switching element d are the same and a driving time of the switching element b and a driving time of the switching element c are the same, an energization period of the inverter circuit becomes longest. When the driving time of the switching element a and the driving time of the switching element d are more shifted (the driving time of the switching element b and the driving time of the switching element c are more shifted), the energization period of the inverter circuit becomes shorter. When the energization period of the inverter circuit becomes shorter, the AC power Pac2 becomes smaller. In the phase shift control, the parameter is a shift amount between the driving time of the switching element a and the driving time of the switching element d (or a shift amount between the driving time of the switching element b and the driving time of the switching element c). Hereinafter, the shift amount is set as a phase shift value.

The phase shift value may be expressed, for example, in a percentage in which a length of one cycle of the AC power Pac2 (that is, 360 degrees) is 100%. In this case, in a state where a phase shift is not performed at all, the phase shift value is 0%. In the phase shift control, when the phase shift value is 0%, the AC power Pac2 is maximized and the load power Pout is also maximized. A maximum value of the phase shift value varies with a circuit characteristic of the first coil 21 (for example, a characteristic of a resonant circuit of the first coil 21 and a capacitor not illustrated in the drawings) and it is about 50%, for example. That is, in one aspect, a lower limit value of the phase shift value can be set to 0%. An upper limit value of the phase shift value can be set to 50%.

The control of the DC power Pdc is described. In the control of the DC power Pdc, the magnitude of a voltage Vdc of the DC power Pdc is changed. Changing of the voltage Vdc of the DC power Pdc is performed using, for example, the step-up/step-down function of the power converter 26 described above. For example, when the voltage Vdc of the DC power Pdc increases, the AC power Pac2 also increases and when the voltage Vdc of the DC power Pdc decreases, the AC power Pac2 also decreases. Therefore, the parameter in the control of the DC power Pdc is the magnitude of the voltage Vdc of the DC power Pdc.

In the present specification, an example of the case where the frequency control is used as the power control is mainly described in detail. The phase shift control and the control of the DC power Pdc can also be explained by the same principle as the frequency control. Hereinafter, the frequency of the AC power Pac2 may be referred to as a "driving frequency f". A change amount of the driving frequency f that is changed (controlled) by the frequency control may be referred to as a "frequency control amount Δf". In addition, the phase shift value in the phase shift control of the DC/AC converter 27 may be referred to as a "phase shift value θ".

The power receiver 3 includes a second coil 31, a second converter 32, a second detector 33, a second communication device 34, and a second controller 35.

The second coil 31 is a coil for receiving the power wirelessly supplied from the power transmitter 2. The magnetic flux generated by the first coil 21 interlinks with the second coil 31, so that AC power Pac3 is generated in the second coil 31. The second coil 31 supplies the AC power Pac3 to the second converter 32. Between the second coil 31 and the second converter 32, a capacitor and an inductor (for example, a reactor) may be connected.

The second converter 32 is a circuit configured to convert the AC power Pac3 received by the second coil 31 into the load power Pout desirable for the load L. When the load L is a DC load, the second converter 32 is an AC/DC converter (rectifier circuit) configured to convert the AC power Pac3 into the DC load power Pout. In this case, the second converter 32 may include the step-up/step-down function to output the load power Pout desirable for the load L. The step-up/step-down function can be realized by a chopper circuit or a transformer, for example. The second converter 32 may further include a transformer that is provided at an input of the AC/DC converter.

When the load L is an AC load, the second converter 32 further includes the DC/AC converter (inverter circuit) in addition to the AC/DC converter configured to convert the AC power Pac3 into the DC power. The DC/AC converter converts the DC power converted by the AC/DC converter into the AC load power Pout. The second converter 32 may further include a transformer that is provided at the input of the AC/DC converter. When the AC power Pac3 supplied from the second coil 31 is the AC power desirable for the load L, the second converter 32 may be omitted.

The second detector 33 acquires a measurement value related to the load power Pout that is supplied to the load L. The second detector 33 measures the load voltage, the load current, or the load power Pout that is supplied to the load L. The second detector 33 is a voltage sensor, a current sensor, or a combination thereof, for example. The second detector 33 outputs the acquired measurement value to the second controller 35. The load L outputs the power command value to the second controller 35. The power command value is a value corresponding to the desired power to be supplied to the load L and shows the magnitude of the desired power to be supplied to the load L hereinafter. The power command value corresponding to the desired power may not be a value of power. The power is a value obtained by multiplying a current and a voltage. Therefore, when one is constant, the other value that realizes the desired power is determined. The determined value may be used as the power command value. For example, when the load L is a storage battery, the power command value may be a command value of current, voltage, or power determined according to a state of charge (SOC) of the load L.

The second communication device 34 is a circuit for performing wireless communication with the first communication device 24 of the power transmitter 2. By the second communication device 34, the power receiver 3 is capable of performing communication with the power transmitter 2. The second communication device 34 is, for example, an antenna for a communication method using radio waves or a light-emitting element and a light-receiving element for a communication method using optical signals. The second communication device 34 transmits information received from the second controller 35 to the power transmitter 2.

The second controller 35 is a processing device such as a CPU and a DSP. The second controller 35 may include a ROM, a RAM, an interface circuit for connection with each unit of the power receiver 3, and the like. The second controller 35 transmits the measurement value received from the second detector 33 and the power command value received from the load L to the power transmitter 2 through the second communication device 34.

For example, by connecting the power transmitter 2 to a storage battery of an electric vehicle instead of the power source PS and by connecting the power receiver 3 to the power source PS instead of the load L, it is also possible to transmit the power from the power receiver 3 to the power transmitter 2.

First Embodiment

Figure 4:
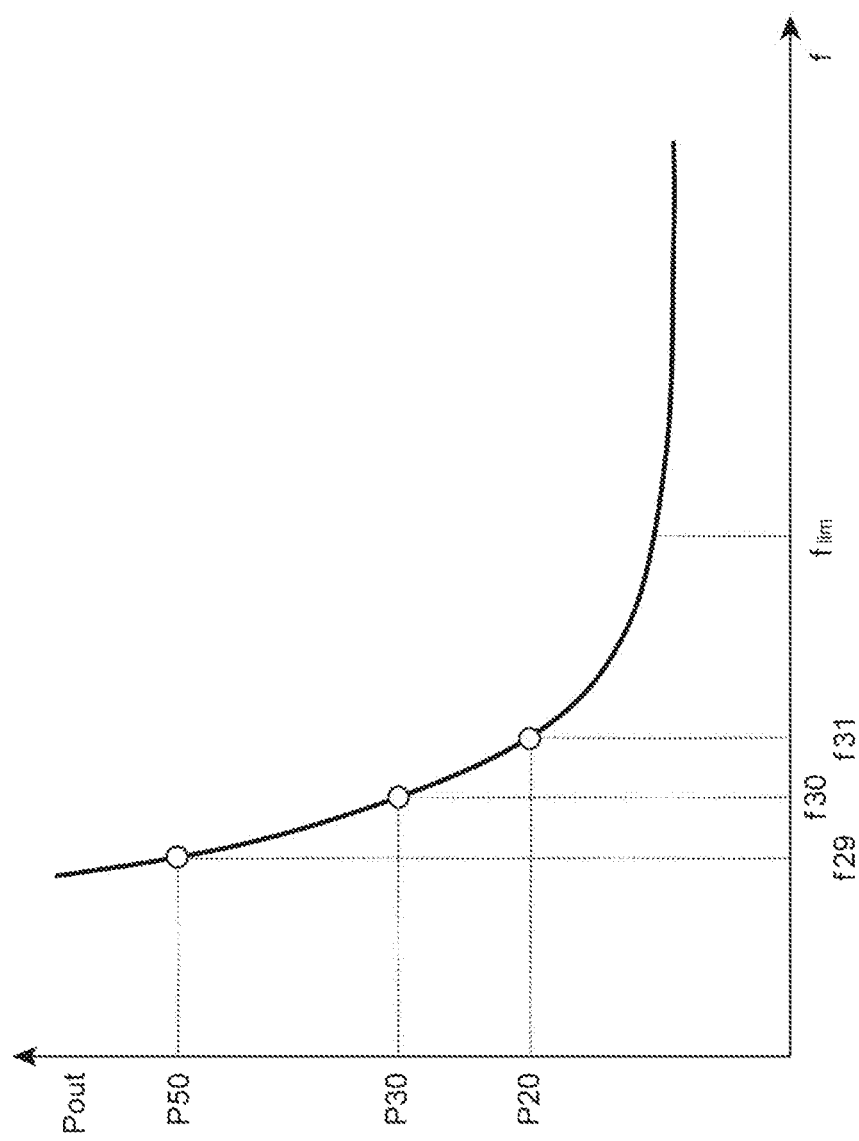
FIG. 4 is a diagram for explaining power adjustment by frequency control.

Next, frequency control by a first controller 25 of a power transmitter 2 according to a first embodiment is described in detail using FIG. 4. A horizontal axis of a graph of FIG. 4 shows a driving frequency f and a vertical axis thereof shows (the magnitude of) load power Pout. flim of FIG. 4 shows an upper limit value determined for the driving frequency f.

The graph of FIG. 4 shows an example of the case where the load power Pout decreases according to an increase in the driving frequency f as described above as a characteristic showing a relation between the driving frequency f and the load power Pout (hereinafter, simply referred to as a "power characteristic"). Hereinafter, a method of adjusting the load power Pout by changing the driving frequency f is specifically described.

For example, it is assumed that the driving frequency f is initially a frequency f30. The load power Pout at this time is power P30. Here, for example, the driving frequency f is decreased from the frequency f30 to a frequency f29. Then, the load power Pout becomes power P50 corresponding to the driving frequency f=f29. Therefore, the load power Pout increases from the power P30 to the power P50. On the other hand, the driving frequency f is increased from the frequency f30 to a frequency f31. Then, the load power Pout becomes power P20 corresponding to the driving frequency f=f31. Therefore, the load power Pout decreases from the power P30 to the power P20.

The first controller 25 can cause the load power Pout to approach desired power (power P50, P20, or the like) by controlling the driving frequency f as described above. In control that actually changes (increases and decreases) the driving frequency f, the driving frequency f may be changed in units of steps. The magnitude of one step for changing the driving frequency f is not particularly limited and may be, for example, about several hertz to several tens of hertz or several tens of hertz to several hundreds of hertz. The magnitude of one step is determined, for example, by a clock resolution of a CPU to be the first controller 25.

Figure 5:
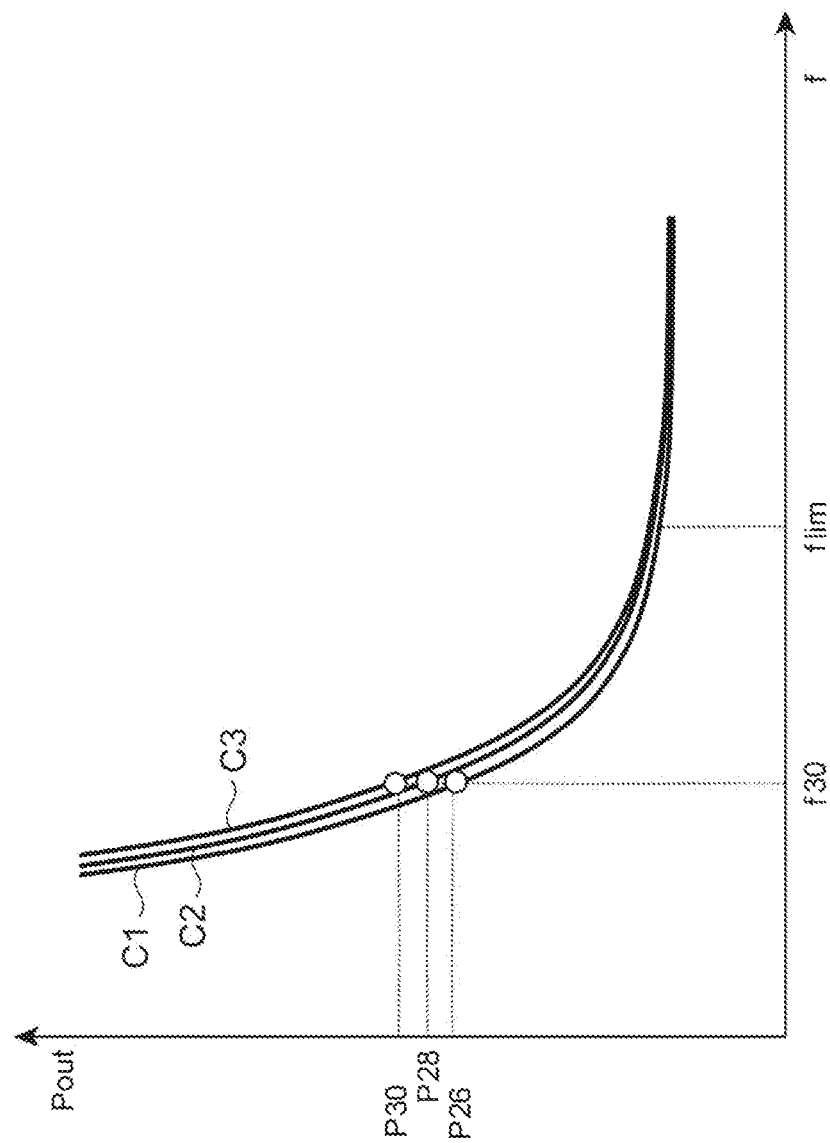
FIG. 5 is a diagram for explaining power adjustment by phase shift control and voltage control.

Next, phase shift control and voltage control by the first controller 25 of the power transmitter 2 are described in detail using FIG. 5. Similarly to the graph of FIG. 4, a graph of FIG. 5 shows power characteristics. However, in the graph of FIG. 5, different power characteristics by three curves of curves C1, C2 and C3 are shown. The power characteristics can take the different power characteristics shown by the curves C1 to C3, for example, by changing a phase shift value θ or by changing a voltage Vdc. When the phase shift value θ is larger, an energization period of an inverter circuit is shorter and AC power Pac2 is smaller. Therefore, the power characteristic changes such that the load power Pout decreases, as the phase shift value θ increases. In addition, when a voltage Vdc is larger, DC power Pdc can be larger. Therefore, the power characteristic can change such that the load power Pout increases, as the voltage Vdc increases.

Regarding the phase shift value θ, for example, it is assumed that the phase shift value θ is initially a predetermined value (for example, 0%) and the power characteristic is the power characteristic shown by the curve C3. It is assumed that the driving frequency f is the frequency f30. The load power Pout at this time is the power P30. Here, for example, the phase shift value θ is increased by a predetermined value without changing the driving frequency f. Then, the power characteristic becomes the power characteristic shown by the curve C2, for example. The load power Pout at this time becomes the power P28. Therefore, the load power Pout decreases from the power P30 to the power P28. Furthermore, if the phase shift value θ is increased by a predetermined value without changing the driving frequency f, the power characteristic becomes the power characteristic shown by the curve C1, for example. The load power Pout at this time becomes the power P26. Therefore, the load power Pout further decreases from the power P28 to the power P26.

For example, by controlling the phase shift value θ as described above, it is possible to cause the load power Pout to approach the desired power (power P28 or power P26) without changing the driving frequency f.

Here, in the control to actually change (increase) the phase shift value θ, the phase shift value θ is changed in units of steps. The magnitude of one step for changing the phase shift value θ is not particularly limited and may be, for example, about several degrees.

The voltage Vdc is also described using the graph of FIG. 5. For example, it is assumed that the voltage Vdc is initially a predetermined value and the power characteristic is the power characteristic shown by the curve C2. It is assumed that the driving frequency f is the frequency f30. The load power Pout at this time is the power P28. Here, for example, the voltage Vdc is increased by a predetermined value without changing the driving frequency f. Then, the power characteristic becomes the power characteristic shown by the curve C3, for example. The load power Pout at this time becomes the power P30. Therefore, the load power Pout increases from the power P28 to the power P30. On the other hand, if the voltage Vdc is decreased by a predetermined value without changing the driving frequency f, the power characteristic becomes the power characteristic shown by the curve C1, for example. The load power Pout at this time becomes the power P26. Therefore, the load power Pout decreases from the power P28 to the power P26.

For example, by controlling the voltage Vdc as described above, it is possible to cause the load power Pout to approach the desired power (power P30 or power P26).

In control to actually change (increase and decrease) the voltage Vdc, the voltage Vdc may be changed in units of steps. The magnitude of one step for changing the voltage Vdc is not particularly limited and may be, for example, about several volts to several tens of volts.

Here, in the frequency control described above with reference to FIG. 4, because a minimum value of the unit step when the driving frequency f is changed is limited by hardware performance or the like, there is a limitation in adjustment accuracy of the load power Pout by changing the driving frequency f. In addition, because a range of the driving frequency f that can be used is limited, an adjustment range of the load power Pout is also limited.

On the other hand, by combining and executing the frequency control and the phase shift control and the voltage control described above with reference to FIG. 5, the load power Pout is finely adjusted as compared with the case where only the frequency control is executed. In addition, even if the driving frequency f is set to an upper limit value or a lower limit value of the range in which the driving frequency f can be used in the frequency control, the phase shift control or the voltage control is further executed, so that adjustment of the load power Pout beyond the adjustment range of the load power Pout in the frequency control is performed.

In this embodiment, the first controller 25 performs power control such that the load power Pout approaches a power command value. A state where the load power Pout approaches the power command value is, for example, a state where a difference (absolute value) between (a value indicating the magnitude of) the load power Pout and the power command value is an error allowance value or less. The error allowance value is an upper limit value of a range allowable as the absolute value of the difference between the power command value and the load power Pout. That is, the power control executed by the first controller 25 is control for adjusting the load power Pout, such that the difference between the load power Pout and the power command value becomes the error allowance value or less.

By the power control, for example, control (power constant control) for maintaining the load power Pout constant is realized. The power characteristics described above with reference to FIGS. 4 and 5 change in the case where a relative misalignment of the first coil 21 and the second coil 31 occurs and a coupling coefficient of the first coil 21 and the second coil 31 changes, for example. In the example illustrated in FIG. 1, if a passenger gets on and off the electric vehicle EV and the passenger loads or unloads a baggage on and from the electric vehicle EV when wireless power transfer is performed on the electric vehicle EV, a weight of the electric vehicle EV changes. Accordingly, a position of the second coil 31 included in the power receiver 3 changes in the vertical direction in FIG. 1, relative positions of the first coil 21 and the second converter 32 change, and the misalignment may occur. However, even when the power characteristic changes due to the misalignment, the load power Pout can be similarly adjusted by the frequency control, the phase shift control, and the voltage control described above. The power control in this case is used as control for suppressing a change in the load power Pout when the load power Pout changes due to the misalignment occurring during power transmission, for example.

The first controller 25 selects a control mode according to a control mode state flag and executes any one of the frequency control and the phase shift control. The control mode state flag is a flag for designating a type of the control executed in the power control. The control mode state flag is set (updated) to any one value of a value indicating the frequency control and a value indicating the phase shift control, for example. Further, the control mode state flag may be set to a value indicating the voltage control.

In the power control, the frequency control is first selected as the control mode. That is, the first controller 25 first executes the frequency control to cause the load power Pout to approach the power command value. When the load power Pout cannot be caused to approach the power command value by the frequency control, the first controller 25 executes at least one of the phase shift control and the voltage control. When the load power Pout cannot be caused to approach the power command value by the frequency control, for example, the first controller 25 executes the phase shift control and when the load power Pout cannot be caused to approach the power command value by the phase shift control, the first controller 25 further executes the voltage control.

In addition, the first controller 25 executes the power control such that the driving frequency f does not exceed a predetermined upper limit value and does not fall below a predetermined lower limit value in frequency control. The upper limit value determined with respect to the driving frequency f may be, for example, an upper limit value (90 kHz) of a frequency that can be used by the wireless power transfer system 1 or may be the upper limit value of the driving frequency f at which impedance when viewing the side of the first coil 21 from the first converter 22 exhibits inductivity. The lower limit value determined with respect to the driving frequency f may be, for example, a lower limit value (81.38 kHz) of the frequency that can be used by the wireless power transfer system 1 or may be the lower limit value of the driving frequency f at which the impedance when viewing the side of the first coil 21 from the first converter 22 exhibits the inductivity.

In addition, the first controller 25 executes the power control such that a phase shift value θ does not exceed a predetermined upper limit value and does not fall below a predetermined lower limit value in the phase shift control. The upper limit value determined with respect to the phase shift value θ may be determined according to whether or not a DC/AC converter 27 functioning as an inverter can perform soft switching, for example. To realize the soft switching, the impedance when viewing the side of the first coil 21 from the DC/AC converter 27 needs to exhibit the inductivity (a current phase is more delayed than a voltage phase). Hereinafter, it is assumed that the delay of the current phase with respect to the voltage phase is a positive value. When the phase shift value θ increases, the voltage phase approaches the current phase and a phase difference of the current phase with respect to the voltage phase decreases. If the phase difference of the current phase with respect to the voltage phase becomes negative (that is, the current phase is more advanced than the voltage phase), the soft switching cannot be performed. Here, if the phase difference of the voltage and the current is kept the same, the impedance becomes capacitive due to a noise, a control error, and the like. Therefore, to ensure safety, the voltage phase is preferably more advanced by a predetermined value than the current phase. That is, in the phase shift control, it is desirable that the phase difference of the current phase with respect to the voltage phase does not fall below the predetermined value. In this case, there is a limitation in increasing the phase shift value θ. The upper limit value with respect to the phase shift value θ at which the DC/AC converter 27 functioning as the inverter can perform the soft switching is, for example, about 50%. If the soft switching of the DC/AC converter 27 is enabled, the stability of the supply of the AC power Pac2 from the first converter 22 to the first coil 21 is ensured. The lower limit value determined with respect to the phase shift value θ is, for example, 0%.

An upper limit value and a lower limit value of the voltage Vdc are determined on the basis of the step-up/step-down function of the power converter 26, for example. In addition, the voltage Vdc may be switched by voltage switching control, separately from the voltage control. In the voltage switching control, the voltage Vdc is switched such that the power command value is included in an adjustment range of the load power Pout by the frequency control, the phase shift control, and the voltage control.

Figure 6:
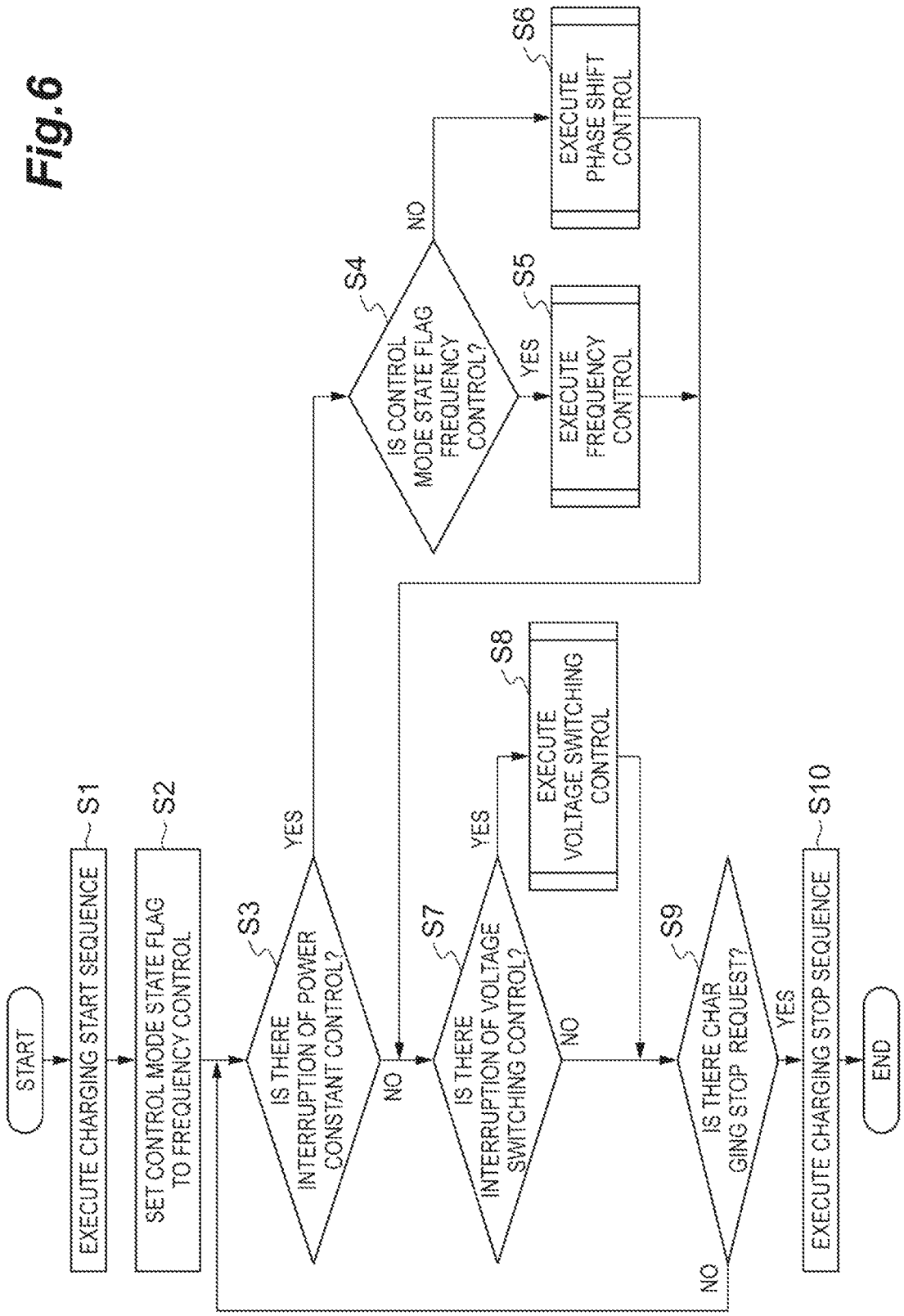
FIG. 6 is a flowchart illustrating an example of processing executed in a power transmitter according to a first embodiment.

Next, an operation of the power transmitter 2 according to the first embodiment is described with reference to FIGS. 6 to 9. FIGS. 6 to 9 are flowcharts illustrating an example of processing executed in the power transmitter 2 according to the first embodiment. First, an overall flow is described using FIG. 6 and some processing in the flowchart of FIG. 6 is then described using FIGS. 7 to 9. Here, the case where the load L is a storage battery and the storage battery is charged with power from the power transmitter 2 is described. The processing of this flowchart starts when the power transmitter 2 receives a charging start request from the side of the power receiver 3, for example. In addition, notification of the measurement value of the load power Pout and the power command value are regularly provided from the power receiver 3 to the power transmitter 2.

First, the first controller 25 executes a charging start sequence (step S1). For example, at the driving frequency f at which the impedance when viewing the side of the first coil 21 from the first converter 22 exhibits inductivity (not capacitive), the supply of the AC power Pac2 to the first coil 21 starts. In addition, the supply of the AC power Pac2 to the first coil 21 starts not to activate a protection function for preventing an excessive current from flowing through the first coil 21.

Next, the first controller 25 sets a control mode state flag to a value indicating the frequency control (step S2). The control mode state flag is set (updated) to a value indicating the frequency control or other control (for example, the phase shift control), in the frequency control or the phase shift control to be executed thereafter.

Next, the first controller 25 determines whether or not there is an interruption of power constant control (step S3). The interruption of the power constant control occurs at a predetermined cycle, for example. The priority of the interruption of the power constant control is higher than the priority of an interruption of voltage switching control in step S7 described below. When it is determined that there is the interruption of the power constant control (YES in step S3), the first controller 25 determines whether or not the control mode state flag is a value indicating the frequency control (step S4). When it is determined that the frequency mode state flag is the value indicating the frequency control (YES in step S4), the first controller 25 executes the frequency control (step S5). Details of the frequency control are described below with reference to FIG. 7. On the other hand, when it is determined in step S4 that the control mode state flag is not the value indicating the frequency control (NO in step S4), the first controller 25 executes the phase shift control (step S6). Details of the phase shift control are described below with reference to FIG. 8.

On the other hand, when it is determined in step S3 that there is no interruption of the power constant control (NO in step S3) or after the processing of step S5 or step S6 is completed, the first controller 25 determines whether or not there is the interruption of the voltage switching control (NO in step S7). The voltage switching control is control for switching a voltage range of the DC power Pdc as necessary, when the power command value is changed. The interruption of the voltage switching control occurs at a predetermined cycle, for example. The cycle at which the interruption of the voltage switching control occurs is longer than the cycle at which the interruption of the power constant control occurs. When it is determined that there is the interruption of the voltage switching control (YES in step S7), the first controller 25 executes the voltage switching control (step S8). Details of the voltage switching control are described below with reference to FIG. 9. As described above, the priority of the interruption of the power constant control in step S3 is higher than the priority of the interruption of the voltage switching control in step S7. For this reason, even in the case where it is determined that there is the interruption of the voltage switching control (YES in step S7), if the interruption of the power constant control occurs, the processing of the power constant control (YES in step S3 and steps S4 to S6) is executed.

When it is determined in step S7 that there is no interruption of the voltage switching control (step S7) or after the processing of step S8 is completed, the first controller 25 determines where or not there is a charging stop request (step S9). Notification of the charging stop request is provided from the power receiver 3 to the power transmitter 2, for example, at timing when SOC of the load L functioning as the storage battery becomes sufficiently high and charging becomes unnecessary. When it is determined that there is no charging stop request (NO in step S9), the first controller 25 returns the processing to step S3 again. On the other hand, when it is determined that there is the charging stop request (YES in step S9), the first controller 25 executes a charging stop sequence (step S10) and a series of processes executed in the power transmitter 2 ends.

According to the processing of FIG. 6, because the control mode state flag is set to the value indicating the frequency control in an initial state (step S2), in the power constant control, first, the frequency control is executed in preference to the phase shift control (YES in step S3, YES in step S4, and step S5). In addition, the interruption of the voltage switching control occurs at a cycle later than the interruption cycle of the power constant control (YES in step S7) and the voltage switching control is executed (step S8).

Next, the frequency control (step S5 of FIG. 6) is described in detail with reference to FIG. 7. First, the first controller 25 acquires a difference between the power command value and the power value of the load (that is, the load power Pout) (step S21). Notification of the power command value and the magnitude of the load power Pout are provided from the power receiver 3 to the power transmitter 2 as described above, for example.

Next, the first controller 25 calculates a candidate value f1 of a new driving frequency f (step S22). For example, when it is necessary to decrease the load power Pout to decrease the difference between the power command value and the load power Pout calculated in step S21, the candidate value f1 is calculated as a frequency higher by a frequency corresponding to a predetermined number of steps than the current driving frequency f. The current driving frequency f is a frequency of the AC power Pac2 supplied to the first coil 21. The predetermined number of steps is, for example, one step. When it is necessary to increase the load power Pout, the candidate value f1 is calculated as a frequency lower by the frequency corresponding to the predetermined number of steps than the driving frequency f of the AC power Pac2 supplied to the first coil 21. Here, when the difference between the power command value and the power value of the load calculated in step S21 is excessively small, the difference between the power command value and the power value of the load may further increase by changing the driving frequency f by one step. For example, if the magnitude of the change amount of the load power Pout when the driving frequency f is changed by one step is larger than twice the difference between the power command value and the current load power Pout, the first controller 25 determines that the difference between the power command value and the load power Pout further increases by changing the driving frequency f by one step. Because the magnitude of the change amount of the load power Pout when the driving frequency f is changed by one step may be different according to the current driving frequency f, for example, it may be determined on the basis of a minimum change amount of the magnitude of the change amount of the load power Pout to be assumed. The magnitude of the change amount of the load power Pout may be determined in advance on the basis of, for example, experimental data or the like and may be stored in a storage unit (for example, a RAM, a ROM, and the like described above) included in the first controller 25. When it is determined that the difference between the power command value and the load power Pout further increases, the candidate value f1 is calculated as the same frequency as the frequency of the AC power Pac2 supplied to the first coil 21, that is, the current driving frequency f.

Next, the first controller 25 determines whether or not the candidate value f1 is equal to the current driving frequency f (step S23). When it is determined that the candidate value f1 is equal to the current driving frequency f (YES in step S23), the first controller 25 determines whether or not the difference between the power command value and the load power Pout is larger than the error allowance value (step S24).

When it is determined in step S24 that the difference between the power command value and the load power Pout is larger than the error allowance value and the load power Pout cannot be caused to approach the desired power (YES in step S24), the first controller 25 executes the phase shift control or the voltage control (step S25). That is, when the adjustment to cause the difference between the load power Pout and the desired power to become the error allowance value or less is not achieved by only the frequency control, the first controller 25 executes the phase shift control or the voltage control. Specifically, as described above with reference to FIG. 5, the first controller 25 adjusts the load power Pout to approach the power command value by changing the phase shift value θ or the voltage Vdc.

Here, in step S25, the phase shift control may be executed in preference to the voltage control. In other words, the voltage control may be executed when the difference between the power command value and the power value of the load does not become the error allowance value or less even by the phase shift control.

When it is determined in step S23 that the candidate value f1 is not equal to the current driving frequency f (NO in step S23), the first controller 25 determines whether or not the candidate value f1 is larger than the upper limit frequency f max (step S26). The upper limit frequency f max is the upper limit value determined with respect to the driving frequency f as described above. When it is determined that the candidate value f1 is larger than the upper limit frequency f max (YES in step S26), the first controller 25 sets the control mode state flag to the value indicating the phase shift control (step S27) and sets the driving frequency f to the upper limit f max (step S28).

On the other hand, when it is determined that the candidate value f1 is the upper limit frequency f max or less (NO in step S26), the first controller 25 sets the driving frequency f to the candidate value f1 (step S29).

When it is determined in step S24 that the difference between the power command value and the load power Pout is the error allowance value or less (NO in step S24) or after the processing of steps S25, S28, and S29 is completed, the first controller 25 ends the frequency control.

Figure 7:
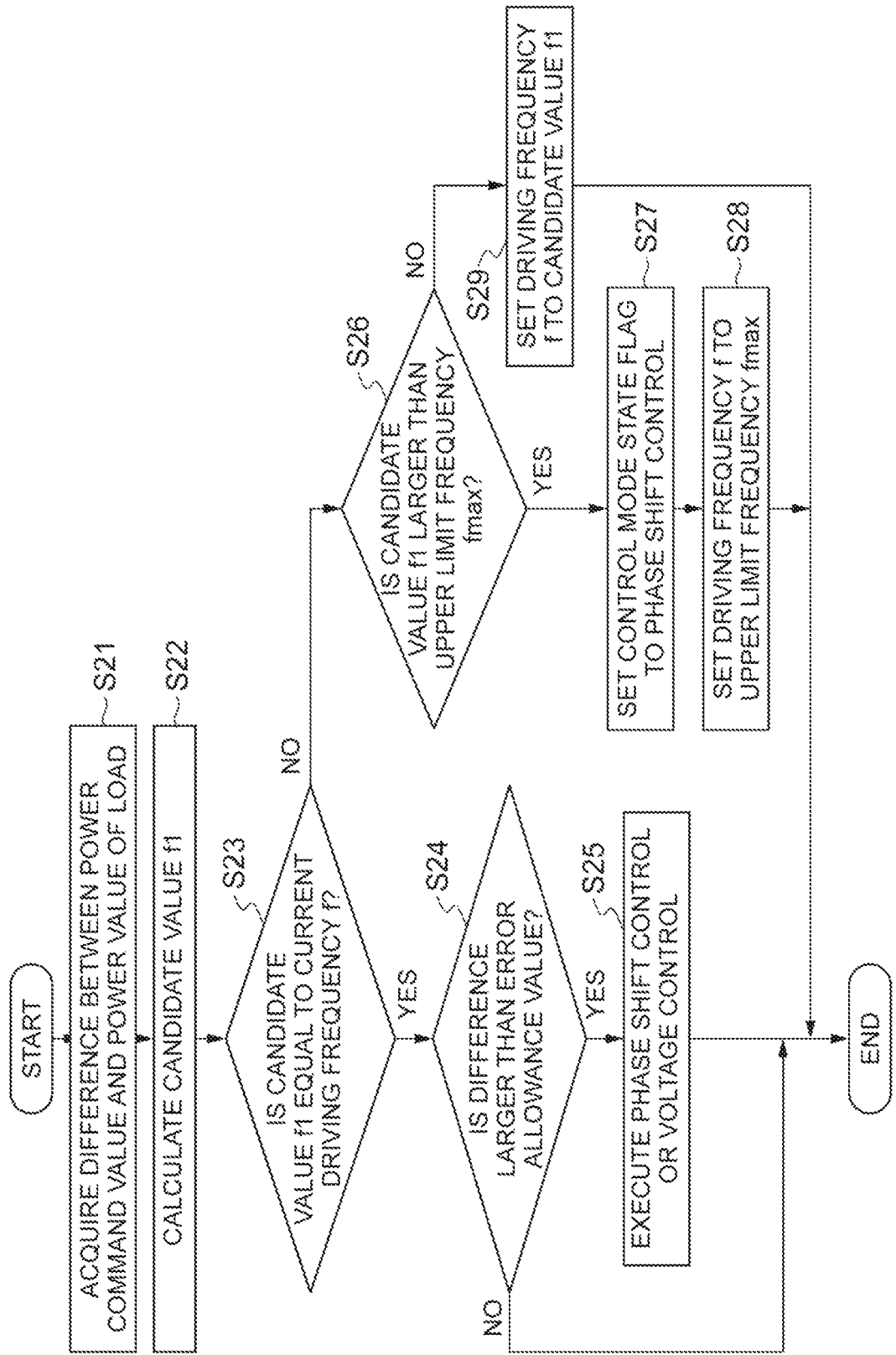
FIG. 7 is a flowchart illustrating an example of processing executed in the power transmitter according to the first embodiment.

In the frequency control illustrated in FIG. 7, the load power Pout is adjusted by changing the driving frequency f (steps S28 and S29). When the difference between the power command value and the load power Pout cannot be caused to become the error allowance value or less (YES in step S24), due to the limitation of the adjustment accuracy of the load power Pout by the frequency control, the load power Pout is adjusted such that the difference between the power command value and the load power Pout of the load L becomes smaller than the error allowance value by the phase shift control or the voltage control (step S25). When the candidate value f1 of the driving frequency f exceeds the upper limit frequency f max, the control mode state flag is set to the value indicating the phase shift control (step S27), the driving frequency f is set to the upper limit frequency f max (step S28), and the power control proceeds from the power control by the frequency control to the power control by the phase shift control (NO in step S4 of FIG. 6 and step S6).

In the processing illustrated in FIG. 7, when the candidate value f1 of the driving frequency f falls below the lower limit value, for example, the driving frequency f may be set to the lower limit frequency and the control mode state flag may be set to the value indicating the phase shift control.

Next, the phase shift control (step S6 of FIG. 6) is described in detail with reference to FIG. 8. The processing of step S41 executed in the beginning is the same as the processing of step S21 of FIG. 7 described above. That is, the first controller 25 acquires the difference between the power command value and the power value of the load (that is, the load power Pout) (step S41).

Next, the first controller 25 calculates a candidate value θ1 of a new phase shift value θ (step S42). For example, when it is necessary to decrease the load power Pout from the difference between the power command value and the load power Pout calculated in step S41, the candidate value θ1 is calculated as a phase shift value larger by the phase shift value corresponding to the predetermined number of steps than the phase shift value θ of the AC power Pac2 supplied to the first coil 21. In addition, when it is necessary to increase the load power Pout, the candidate value θ1 is calculated as a phase shift value smaller by the phase shift value corresponding to the predetermined number of steps than the phase shift value θ of (that is, the current) AC power Pac2 supplied to the first coil 21. Here, for example, when the difference between the power command value and the load power Pout calculated in step S41 is excessively small, the difference between the power command value and the load power Pout may further increase by changing the phase shift value θ by one step. For example, if the magnitude of the change amount of the load power Pout when the phase shift value θ is changed by one step is larger than twice the difference between the power command value and the current load power Pout, the first controller 25 determines that the difference between the power command value and the load power Pout further increases, when the phase shift value θ is changed by one step. Because the magnitude of the change amount of the load power Pout when the phase shift value θ is changed by one step may be different according to the current phase shift value θ, for example, it may be determined on the basis of the minimum change amount of the change amount of the load power Pout to be assumed. The magnitude of the change amount of the load power Pout may be determined in advance on the basis of, for example, experimental data or the like and may be stored in the storage unit included in the first controller 25. When it is determined that the difference between the power command value and the load power Pout further increases, the candidate value θ1 is calculated as the same phase shift value as a phase shift value of the AC power Pac2 supplied to the first coil 21, that is, a current phase shift value θ.

Next, the first controller 25 determines whether or not the candidate value θ1 is equal to the current phase shift value θ (step S43). When it is determined that the candidate value θ1 is equal to the current phase shift value θ (YES in step S43), the first controller 25 determines whether or not the difference between the power command value and the load power Pout is larger than the error allowance value (step S44).

When it is determined in step S44 that the difference between the power command value and the load power Pout is larger than the error allowance value and the load power Pout cannot be caused to approach the desired power (YES in step S44), the first controller 25 executes the voltage control (step S45). That is, when the adjustment to cause the difference between the load power Pout and the power command value to become the error allowance value or less is not achieved even by the phase shift control, the first controller 25 executes the voltage control. Specifically, as described above with reference to FIG. 5, the first controller 25 adjusts the load power Pout to approach the desired power by changing the voltage Vdc of the DC power Pdc.

On the other hand, when it is determined in step S43 that the candidate value θ1 is not equal to the current phase shift value θ (NO in step S43), the first controller 25 determines whether or not the candidate value θ1 is larger than the lower limit phase shift value θ min (step S46). As described above, the lower limit phase shift value θ min is the lower limit value determined with respect to the phase shift value θ. When it is determined that the candidate value θ1 is larger than the lower limit phase shift value θ min (YES in step S46), the first controller 25 sets the phase shift value θ to the candidate value θ1 (step S47). On the other hand, when it is determined that the candidate value θ1 is the lower limit phase shift value θ min or less (NO in step S46), the first controller 25 sets the control mode state flag to the value indicating the frequency control (step S48) and sets the phase shift value θ to the lower limit phase shift value θ min (step S49).

When it is determined in step S44 that the difference between the power command value and the load power Pout is the error allowance value or less (NO in step S44) or after the processing of steps S45, S47, and S49 is completed, the first controller 25 ends the phase shift control.

Figure 8:
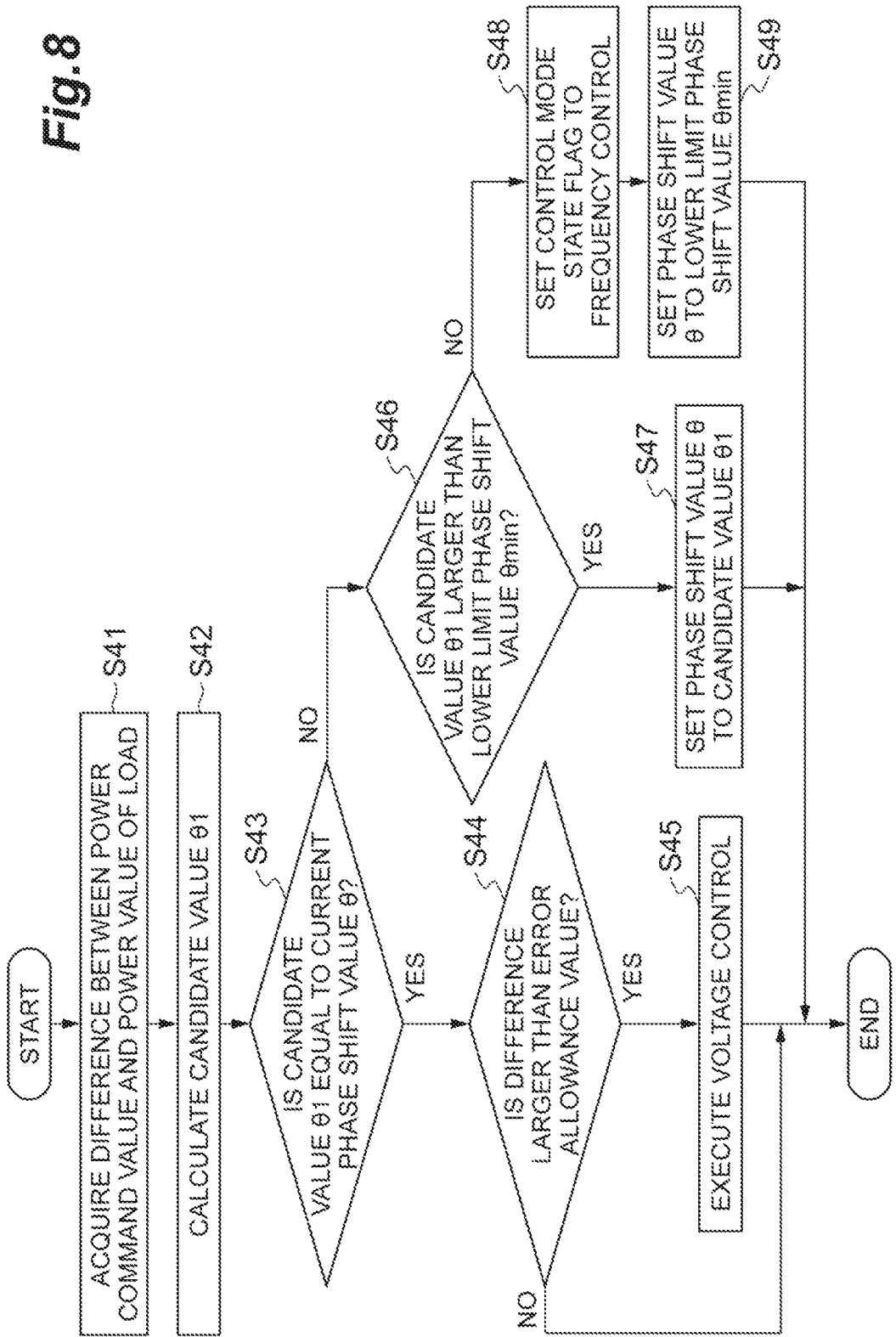
FIG. 8 is a flowchart illustrating an example of processing executed in the power transmitter according to the first embodiment.

In the phase shift control illustrated in FIG. 8, the load power Pout is adjusted by changing the phase shift value θ (steps S47 and S49). When the difference between the power command value and the load power Pout cannot be caused to become the error allowance value or less (YES in step S44), due to the limitation of the adjustment accuracy of the load power Pout by the phase shift control, the load power Pout is adjusted such that the difference between the power command value and the load power Pout becomes smaller than the error allowance value by the voltage control (step S45). Further, when the candidate value θ1 of the phase shift value θ becomes the lower limit phase shift value θ min, the control mode state flag is set to the value indicating the frequency control (steps S48 and S49) and the power control proceeds from the power control by the phase shift control to the power control by the frequency control (YES in step S4 of FIG. 6 and step S5).

In the processing illustrated in FIG. 8, when the candidate value θ1 of the phase shift value θ exceeds the upper limit value, for example, the phase shift value θ may be set to the upper limit value and the control mode state flag may be set to the value indicating the frequency control.

Next, the voltage switching control (step S8 of FIG. 6) is described in detail with reference to FIG. 9. In the voltage switching control, the load power Pout is adjusted by changing the voltage Vdc, similarly to the voltage control. However, in the voltage switching control, the voltage Vdc is not finely changed as much as the voltage control, but the voltage Vdc is switched to any one of voltage levels of several steps, for example. Here, an example of the case where the voltage Vdc is switched in two steps is described. First, the first controller 25 determines whether or not the power command value has been changed (step S51). For example, when the power command value notification of which is provided from the power receiver 3 to the power transmitter 2 is a value different from the power command value notification of which is previously provided, it is determined that the power command value has been changed. When it is determined that the power command value has been changed (YES in step S51), the first controller 25 determines whether or not the power command value is larger than a mode switching value (step S52). The mode switching value is a threshold which becomes a criterion for judgment when the voltage Vdc is switched between a voltage in a low mode and a voltage in a high mode to be described below. The mode switching value is, for example, 1000 W. For example, in the case where the mode switching value is 1000 W, if the power command value is larger than 1000 W, the voltage Vdc is set to the voltage in the high mode and an adjustable range of the load power Pout by the power control becomes a range of 1000 W or more mainly (an upper limit is, for example, about 3000 W or 4000 W). The voltage Vdc in the high mode is a voltage (for example, about 400 V) higher than the voltage Vdc in the low mode. On the other hand, if the power command value is 1000 W or less, the voltage Vdc is set to the voltage in the low mode and the adjustable range of the load power Pout by the power control becomes a range of 1000 W or less mainly. The voltage Vdc in the low mode is a voltage (for example, about 350 V) lower than the voltage Vdc in the high mode. In the voltage switching control, the voltage Vdc is switched such that the power command value is included in the adjustment range of the load power Pout by the frequency control, the phase shift control, and the voltage control.

When it is determined in step S52 that the power command value is larger than the mode switching value (YES in step S52), the first controller 25 determines whether or not a current mode is the high mode (step S53). For example, a flag indicating the state of the mode is set and the first controller 25 determines whether or not the current mode is the high mode by referring to a value of the flag. When it is determined that the current mode is not the high mode (NO in step S53), the first controller 25 switches the mode to the high mode (step S54). Specifically, in step S54, the flag indicating the mode state is set (updated) to a value indicating the high mode.

On the other hand, when it is determined in step S52 that the power command value is the mode switching value or less (NO in step S52), the first controller 25 determines whether or not the current mode is the low mode (step S55). This determination is performed by referring to the flag value described above, for example. When it is determined that the current mode is not the low mode (NO in step S55), the first controller 25 switches the mode to the low mode (step S56). Specifically, in step S56, the flag indicating the mode state is set (updated) to a value indicating the low mode.

After the processing of step S54 or step S56 is completed, the first controller 25 executes the mode switching sequence (step S57). For example, the voltage Vdc is switched according to the mode shown by the flag, such that the impedance when viewing the side of the first coil 21 from the first converter 22 exhibits inductivity (not capacitive). In addition, for example, the voltage Vdc is switched not to activate a protection function for preventing an excessive current flowing through the first coil 21.

When it is determined in step S51 that the power command value has not been changed (NO in step S51), when it is determined in step S53 that the current mode is the high mode (YES in step S53), when it is determined in step S55 that the current mode is the low mode (YES in step S55), or after the processing of step S57 is completed, the first controller 25 ends the voltage switching control.

Figure 9:
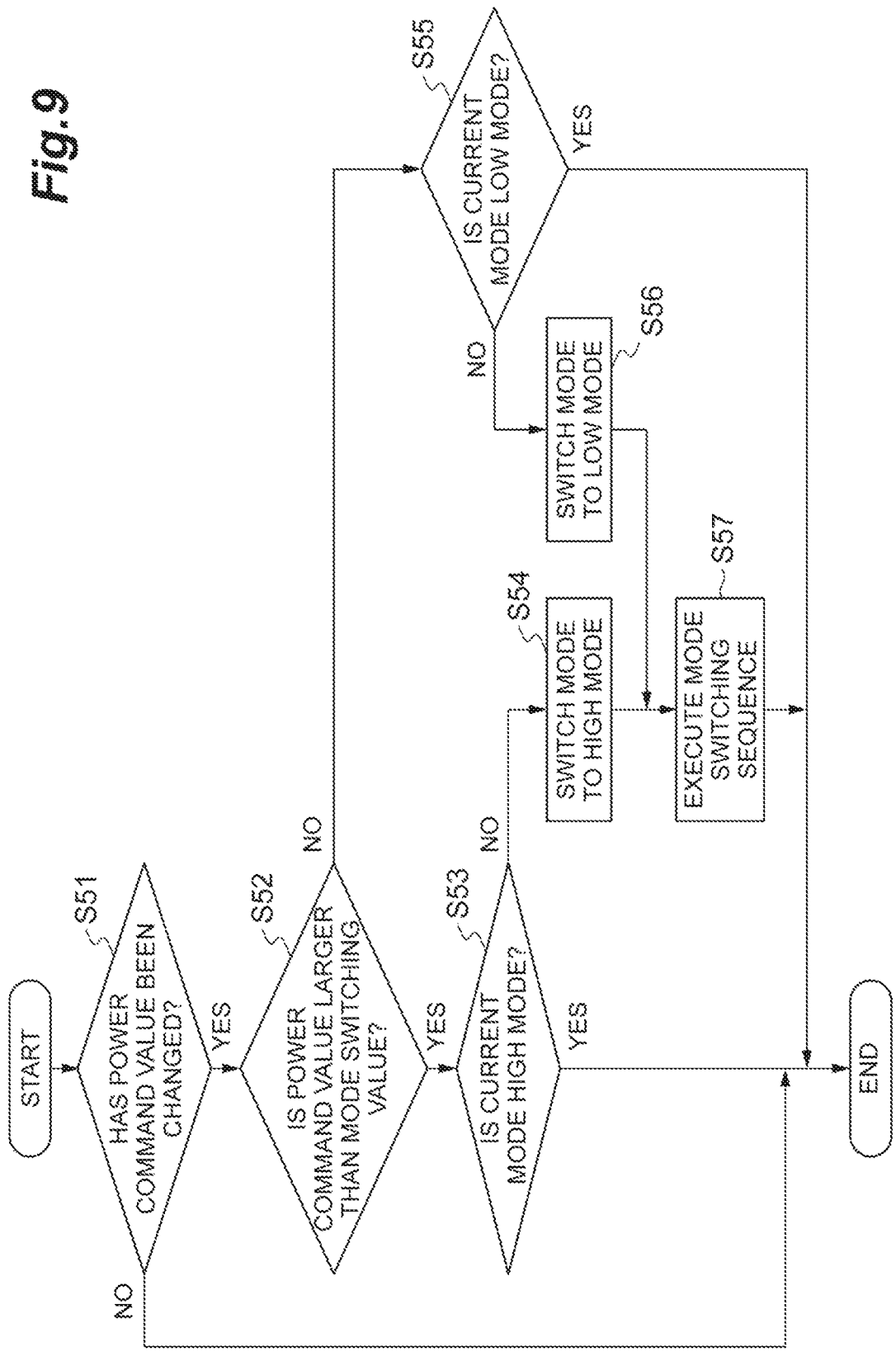
FIG. 9 is a flowchart illustrating an example of processing executed in the power transmitter according to the first embodiment.

In the voltage switching control illustrated in FIG. 9, the voltage Vdc of the DC power Pdc is switched according to the power command value (step S57). Specifically, the voltage Vdc is switched such that the power command value is included in the adjustment range of the load power Pout by the frequency control, the phase shift control, and the voltage control. As such, the voltage Vdc is switched according to the power command value, so that it is easy to cause the load power Pout to approach the power command value by the frequency control, the phase shift control, and the voltage control which can be executed in the power constant control (steps S4 to S6 of FIG. 6). In addition, there is a high possibility that the power adjustment can be performed in a range in which the driving frequency f does not exceed the upper limit value and does not fall below the lower limit value in the frequency control. Similarly, there is a high possibility that the power adjustment can be performed in a range in which the phase shift value θ does not exceed the upper limit value and does not fall below the lower limit value in the phase shift control.

To stabilize the mode switching, a mode switching value for switching from the high mode to the low mode and a mode switching value for switching from the low mode to the high mode are set to different values, respectively, so that hysteresis may be given to the mode switching.

Next, a function and an effect of the power transmitter 2 are described. In the power transmitter 2, in addition to the frequency control, any control of the phase shift control and the voltage control is executed by the first controller 25. When the load power Pout cannot be caused to approach the power command value by the frequency control, at least one control of the phase shift control and the voltage control is executed (step S25 of FIG. 7). As a result, the range of the power adjustment is widened and the power adjustment can be performed more finely, as compared with the case where only the frequency control is executed. Therefore, the load power Pout can be caused to further approach the power command value.

In addition, as described above, in step S25 of FIG. 7, the first controller 25 may execute the phase shift control preferentially rather than the voltage control. In many cases, the phase shift control is superior to the voltage control in responsiveness. Therefore, the phase shift control is executed in preference to the voltage control, so that the responsiveness of the power control can be improved, and the power adjustment can be easily performed.

The first controller 25 may switch the voltage Vdc of the DC power Pdc according to the power command value and execute the power control. The voltage Vdc is switched such that the power command value is included in the adjustment range of the load power Pout by the frequency control and the phase shift control. As a result, it is easy to cause the load power Pout to approach the power command value.

For example, the first controller 25 adjusts the load power Pout by executing the power control such that the difference between the power command value and the load power Pout becomes the error allowance value or less. In this case, the power control can be executed with desired accuracy by appropriately setting the error allowance value.

In addition, the first controller 25 executes the power control such that the phase shift value θ does not fall below the lower limit value in the phase shift control. As a result, because a phase difference of a predetermined value or more is secured, it is possible to execute the power control while securing the stability of the supply of the AC power Pac2 from the first converter 22 to the first coil 21.

In addition, in the wireless power transfer system 1, the load power Pout supplied to the load L may be detected using the second detector 33 of the power receiver 3 and the power control may be executed in the power transmitter 2 by using a detection result thereof. In this case, for example, the accuracy of the power control can be improved as compared with the case where the power control is executed by estimating the load power Pout supplied to the load L at the side of the power transmitter 2.

Of course, the power control may be executed by estimating the load power Pout at the side of the power transmitter 2 without providing notification of the magnitude of the load power Pout from the power receiver 3 to the power transmitter 2. For example, the first controller 25 may estimate the load power Pout, on the basis of the AC power Pac2 supplied from the first converter 22 to the first coil 21. This is because the AC power Pac2 and the load power Pout are associated with each other. For example, when a power loss rarely occurs in the power transmission by the wireless power transfer system 1, the magnitudes of the AC power Pac2 and the load power Pout are almost equal to each other. Therefore, the magnitude of the AC power Pac2 supplied to the first coil 21 can be estimated as the load power Pout supplied to the load L. In addition, when the power loss is considered, the magnitude of the power loss can be set to a predetermined value (for example, 5%) and a value obtained by subtracting the magnitude of the power loss from the magnitude of the AC power Pac2 can be estimated as the load power Pout. As such, the load power Pout supplied to the load L is estimated on the basis of the AC power Pac2 supplied to the first coil 21, so that it is possible to cause a notification of the load power Pout from the power receiver 3 to the power transmitter 2 to become unnecessary. In this case, there is a high possibility that the configuration of the power transmitter 2 and the power receiver 3, that is, the wireless power transfer system 1 can be simplified and the cost can be reduced.

Although the first embodiment of the present disclosure has been described, the present invention is not limited to the embodiment. For example, the first controller 25 may adjust the load power Pout by executing only one of the phase shift control and the voltage control in addition to the frequency control, as the power control. In addition, in the first embodiment, the example of the case where the first controller 25 first executes the frequency control, executes the phase shift control when the load power Pout cannot be caused to approach the power command value by the frequency control, and executes the voltage control when the load power Pout cannot be caused to approach the power command value even by the phase shift control has been described. However, the first controller 25 may first execute the frequency control, execute the voltage control when the load power Pout cannot be caused to approach the power command value by the frequency control, and execute the phase shift control when the load power Pout cannot be caused to approach the power command value even by the voltage control.

In the flowchart illustrated in FIG. 6, as described above, the cycle at which the interruption of the voltage switching control occurs is longer than the cycle at which the interruption of the power constant control occurs. In this case, regardless of the power constant control by the frequency control, the phase shift control, and the voltage control, the voltage switching control is generated at a cycle longer than the cycle at which the interruption of the power constant control occurs and the voltage Vdc is switched according to the power command value. Even in this case, as described above, because the priority of the interruption of the power constant control is higher than the priority of the interruption of the voltage switching control, the power constant control is executed at a cycle shorter than the cycle at which the interruption of the voltage switching control occurs. As a result, because the power constant control is executed following the change of the voltage Vdc by switching of the voltage Vdc, the load power Pout can be caused to approach the power command value, even when both the controls of the voltage switching control and the power constant control coexist.

In addition, in the first embodiment, if the difference between the power command value and the load power Pout becomes the error allowance value or less (NO in step S24 or NO in step S44), the power control by the phase shift control and the voltage control is not performed and the power constant control ends. However, even when the difference between the power command value and the load power Pout becomes the error allowance value or less (NO in step S24 or NO in step S44), the power control (that is, the processing of step S25 and step S45) may be further executed.

Second Embodiment

Figure 10:
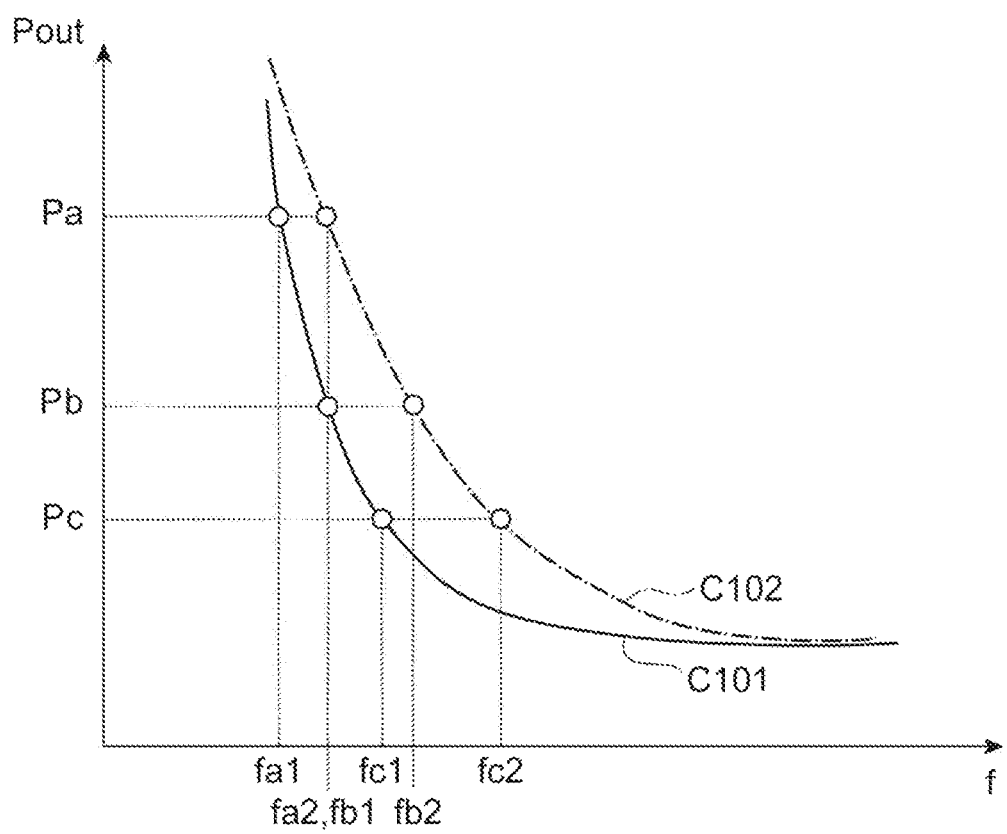
FIG. 10 is a diagram for explaining power adjustment by frequency control.

Next, frequency control by a first controller 25 of a power transmitter 2 according to a second embodiment is described in detail using FIG. 10.

A horizontal axis of a graph of FIG. 10 shows a frequency and a vertical axis thereof shows (the magnitude of) power. The frequency is the driving frequency f described above, that is, a frequency of AC power Pac2 supplied to a first coil 21. The power is the load power Pout described above, that is, power supplied to a load L.

A characteristic (hereinafter, simply referred to as a "power characteristic") showing a relation between the driving frequency f and the load power Pout, which is shown by the graph of FIG. 10, can be changed by a coupling coefficient k of the first coil 21 and a second coil 31. The coupling coefficient k changes according to a relative position relation between the first coil 21 and the second coil 31, for example. For example, if a misalignment occurs due to a change in the position relation between the first coil 21 and the second coil 31, the coupling coefficient k changes. In general, the misalignment is a misalignment with respect to reference positions of the first coil 21 and the second coil 31 where the coupling coefficient k is maximized. Therefore, the coupling coefficient k is smaller when the misalignment is larger. As power characteristics at different coupling coefficients k, in the graph of FIG. 10, two curves of a curve C101 and a curve C102 are shown.

The graph of FIG. 10 illustrates an example of the case where the load power Pout decreases as the driving frequency f increases as described above as the power characteristics shown by the curves C101 and C102. Specifically, a method of adjusting the load power Pout by changing the driving frequency f is described.

For example, in the power characteristic shown by the curve C101, it is assumed that the driving frequency f is initially a frequency fb1. The load power Pout at this time is power Pb. Here, for example, the driving frequency f is decreased from the frequency fb1 to a frequency fa1 (that is, a frequency control amount Δf=fa1−fb1). Then, the load power Pout becomes power Pa corresponding to the driving frequency f=fa1. Therefore, the load power Pout increases from the power Pb to the power Pa.

On the other hand, when the load power Pout is decreased, for example, the driving frequency f is increased from the frequency fb1 to a frequency fc1 (that is, a frequency control amount Δf=fc1−fb1). Then, the load power Pout becomes power Pc corresponding to the driving frequency f=fc1. Therefore, the load power Pout decreases from the power Pb to the power Pc.

The same description is applied to the power characteristic shown by the curve C102. That is, it is assumed that the driving frequency f is initially a frequency fb2. The load power Pout at this time is the power Pb. Here, for example, the driving frequency f is decreased from the frequency fb2 to a frequency fa2 (that is, a frequency control amount Δf=fa2−fb2). Then, the load power Pout becomes the power Pa corresponding to the driving frequency f=fa2. Therefore, the load power Pout increases from the power Pb to the power Pa.

On the other hand, when the load power Pout is decreased, for example, the driving frequency f is increased from the frequency fb2 to a frequency fc2 (that is, a frequency control amount Δf=fc2−fb2). Then, the load power Pout becomes the power Pc corresponding to the driving frequency f=fc2. Therefore, the load power Pout decreases from the power Pb to the power Pc.

For example, the driving frequency f is controlled as described above, so that the load power Pout can be caused to approach desired power (power Pa, Pc, or the like). In addition, as described below, a change in the load power Pout when the coupling coefficient k changes can be suppressed.

That is, as described above, the coupling coefficient k of the first coil 21 and the second coil 31 can change according to the position relation of both sides. For example, in the example illustrated in FIG. 1, if a passenger gets on and off an electric vehicle EV or the passenger loads or unloads a baggage on and from the electric vehicle EV when wireless power transfer is performed on the electric vehicle EV, a weight of the electric vehicle EV changes. Accordingly, a position of the second coil 31 included in a power receiver 3 changes in a vertical direction of FIG. 1, a relative position of the second coil 31 with respect to the first coil 21 changes, and a misalignment occurs.

For example, it is assumed that the power characteristic is initially the power characteristic shown by the curve C101. In addition, it is assumed that the driving frequency f is the frequency fb1. The load power Pout at this time is the power Pb. Here, it is assumed that the misalignment occurs, the coupling coefficient k changes, and the power characteristic changes to a curve shown by the curve C102. In this case, if the driving frequency f remains at the frequency fb1, the load power Pout increases from the power Pb to the power Pa. On the other hand, the driving frequency f is increased from the frequency fb1 to the frequency fb2 (that is, the frequency control amount Δf=fb2−fb1), so that the load power Pout can be caused to approach the power Pb again.

As described above, the magnitude of the load power Pout can be adjusted by changing (controlling) the driving frequency f. The frequency control is executed by the first controller 25, so that the load power Pout can be caused to approach the desired power.

Here, in the curves C101 and C102, an inclination is different for each driving frequency f. A change amount of the driving frequency f can correspond to the frequency control amount Δf described above. Therefore, an inclination of the power characteristic at each driving frequency f is defined as a load power change rate ΔP/Δf.

Specifically, the load power change rate ΔP/Δf shows a change amount ΔP (for example, the change amount ΔP=Pa−Pb or Pc−Pb) of the load power Pout supplied to the load L with respect to a predetermined frequency change amount (for example, the frequency control amount Δf=fb1−fa1, Δf=fb1−fc1, or the like) of the driving frequency f from a reference frequency (for example, the frequency fb). The load power change rate ΔP/Δf can be set to correspond to each of different reference frequencies (for example, frequencies fa1, fb1, fc1, and the like).

To execute the frequency control using the load power change rate ΔP/Δf, in this embodiment, the load power change rate ΔP/Δf in a wireless power transfer system 1 is set.

For example, the load power change rate ΔP/Δf may be obtained in real time on the basis of a change in the load power Pout with respect to a change in the driving frequency f during the frequency control and may be set. Alternatively, the load power change rate ΔP/Δf may be received from other device (for example, the electric vehicle EV or the like to be a power feeding target) provided with the power receiver 3 by communication with the outside of the power transmitter 2 and may be set. In this case, because other device identifies a characteristic of the power receiver 3, an appropriate load power change rate ΔP/Δf corresponding to the power receiver 3 is acquired. Therefore, for example, even when a characteristic and the like of the power receiver 3 are different for each type of vehicle, wireless power transfer is performed with an appropriate load power change rate ΔP/Δf. When the load power change rate ΔP/Δf is received from the outside of the power transmitter 2, numerical data indicating the load power change rate ΔP/Δf may be received or information to identify power characteristics of some predetermined patterns may be received. If the pattern of the power characteristic is identified, the load power change rate ΔP/Δf can be set according to the identified power characteristic. Alternatively, the load power change rate ΔP/Δf may be previously set. When the load power change rate ΔP/Δf is previously set, the load power change rate ΔP/Δf may be set on the basis of experimental data or may be set by a simulation or the like from design data of the power transmitter 2, the power receiver 3, and the load L.

The load power change rate ΔP/Δf set as described above is described by a data table stored in a storage unit (the RAM or the like described above) (not illustrated in the drawings) included in the first controller 25, for example.

Next, an example of a method of generating the data table will be described using FIGS. 11 to 14.

Figure 11:
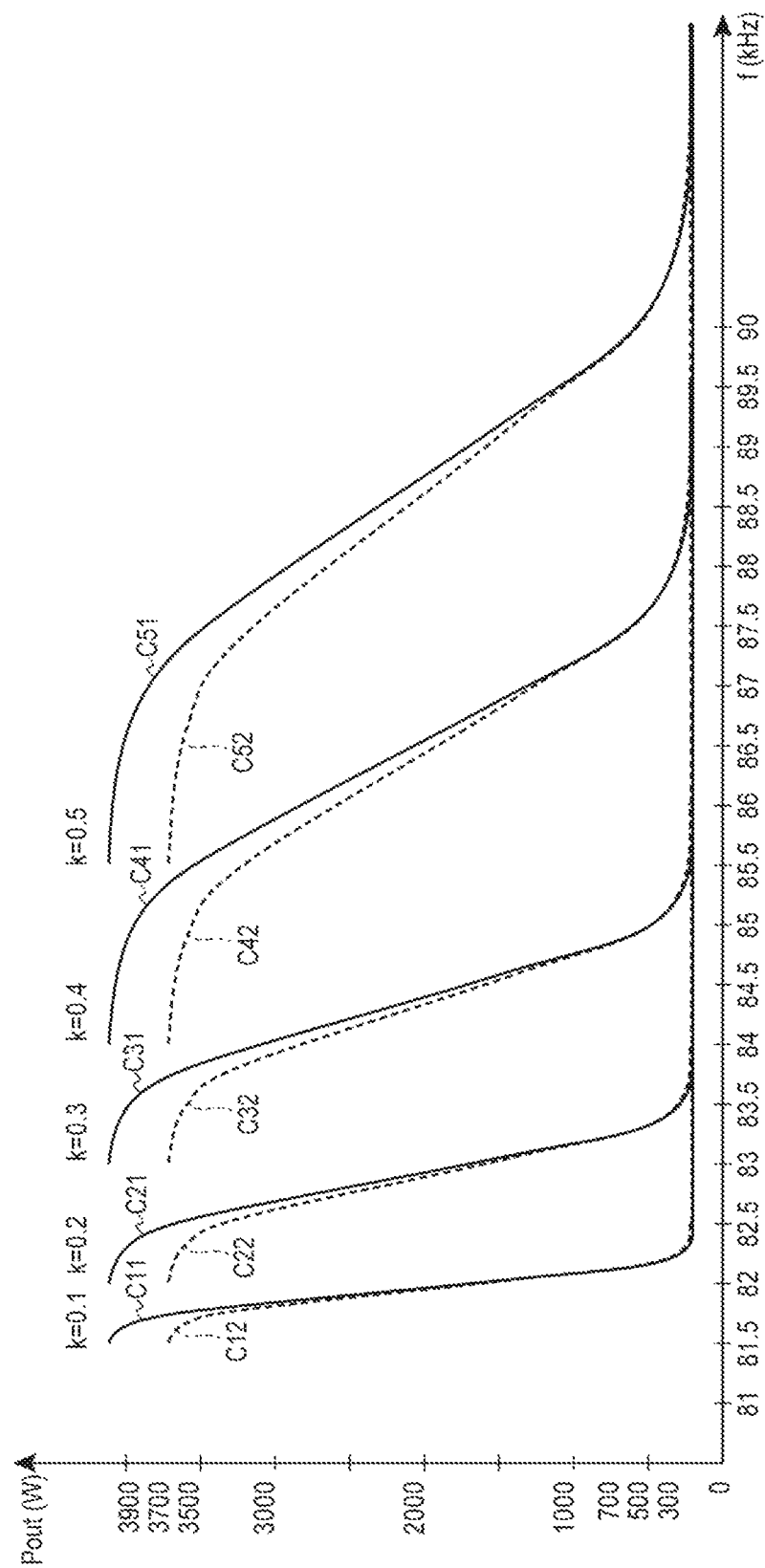
FIG. 11 is a diagram for explaining an example of a data table generation method.

FIG. 11 is a diagram illustrating an example of power characteristics in the wireless power transfer system 1. In a graph of FIG. 11, each of power characteristics when coupling coefficients k are 0.1, 0.2, 0.3, 0.4, and 0.5 is shown by two curves like curves C11 and C12, curves C21 and C22, curves C31 and C32, curves C41 and C42, and curves C51 and C52. The curves C11, C21, C31, C41, and C51 show power characteristics when a voltage range of the load power Pout is a relatively high voltage range (for example, 301 V to 400 V or more). The curves C12, C22, C32, C42, and C52 show power characteristics when a power range of the load power Pout is a relatively low voltage range (for example, less than 100 V, 100 V to 200 V, or 201 V to 300). In this example, a method of generating a data table using the power characteristics at the five different coupling coefficients k is described. However, the data table may be generated using power characteristics at more different coupling coefficients k.

First, the graph shown in FIG. 11 is divided into a plurality of areas. For example, the graph of FIG. 11 is divided in a range of the load power Pout as shown by a one-dot chain line in FIG. 12 and is divided in a range of the driving frequency f as shown by a two-dot chain line, so that the graph is divided into the plurality of areas.

The data table to be generated describes a corresponding load power change rate ΔP/Δf by numerical data, for each of the plurality of divided areas. Here, the load power change rate ΔP/Δf is an inclination of the power characteristic shown by the curve such as the curve C11. If the area is set excessively widely, a value of the load power change rate ΔP/Δf corresponding to the area may not be appropriately shown. Therefore, a size of the area to be divided, that is, the range of the driving frequency f and the range of the load power Pout determining the area are set according to the inclination of the curve showing the power characteristic, such that the value of the load power change rate ΔP/Δf corresponding to each area is more appropriately shown. Specifically, in the graph, a portion where a change in the inclination of the curve is relatively large is divided in a relatively small area and a portion where a change in the inclination of the curve is relatively small is divided in a relatively large area. That is, when different reference frequencies are arranged in ascending order or descending order, an interval between adjacent reference frequencies is set to be larger when a change amount of the load power change rate ΔP/Δf with respect to the driving frequency f is smaller. In other words, the interval between the adjacent reference frequencies is set to be smaller when the change amount of the load power change rate ΔP/Δf with respect to the driving frequency f is larger.

In addition, the load power change rate ΔP/Δf corresponding to each of the plurality of divided areas is obtained as numerical data. For example, the numerical data is calculated as the magnitude of the steepest inclination among the inclinations of the curve (which may include a plurality of curves) included in the corresponding area. However, a method of calculating the numerical data is not limited thereto. For example, the numerical data may be calculated as the magnitude of the inclination when the curve included in the corresponding area is linearly approximated. When the plurality of curves are included in the same area, values of inclinations when the individual curves may be linearly approximated may be calculated and a value of an inclination with the largest magnitudes in the values may be calculated as the numerical data. Alternatively, an average value of the calculated inclinations of the individual curves may be calculated as the numerical data.

In control to actually change (increase and decrease) the driving frequency f, the driving frequency f may be changed in units of steps. The magnitude of one step is determined, for example, by a clock resolution of a CPU to be the first controller 25. The magnitude of one step is not particularly limited and may be, for example, about several hertz to several tens of hertz or several tens of hertz to several hundreds of hertz. Therefore, a unit of the load power change rate ΔP/Δf described in the data table can be W/step.

Each data table may be generated according to the voltage range of the load power Pout. This is because the voltage range is different according to a configuration of a storage battery, a charging/discharging state of the storage battery, and the like, when the load L is the storage battery, for example. For example, when the voltage range of the load power Pout is a relatively high voltage range, a corresponding data table may be generated on the basis of power characteristics shown by a plurality of curves including the curves C11, C21, C31, C41, and C51. When the voltage range of the load power Pout is a relatively low voltage range, a corresponding data table may be generated on the basis of power characteristics shown by a plurality of curves including the curves C12, C22, C32, C42, and C52.

Figure 12:
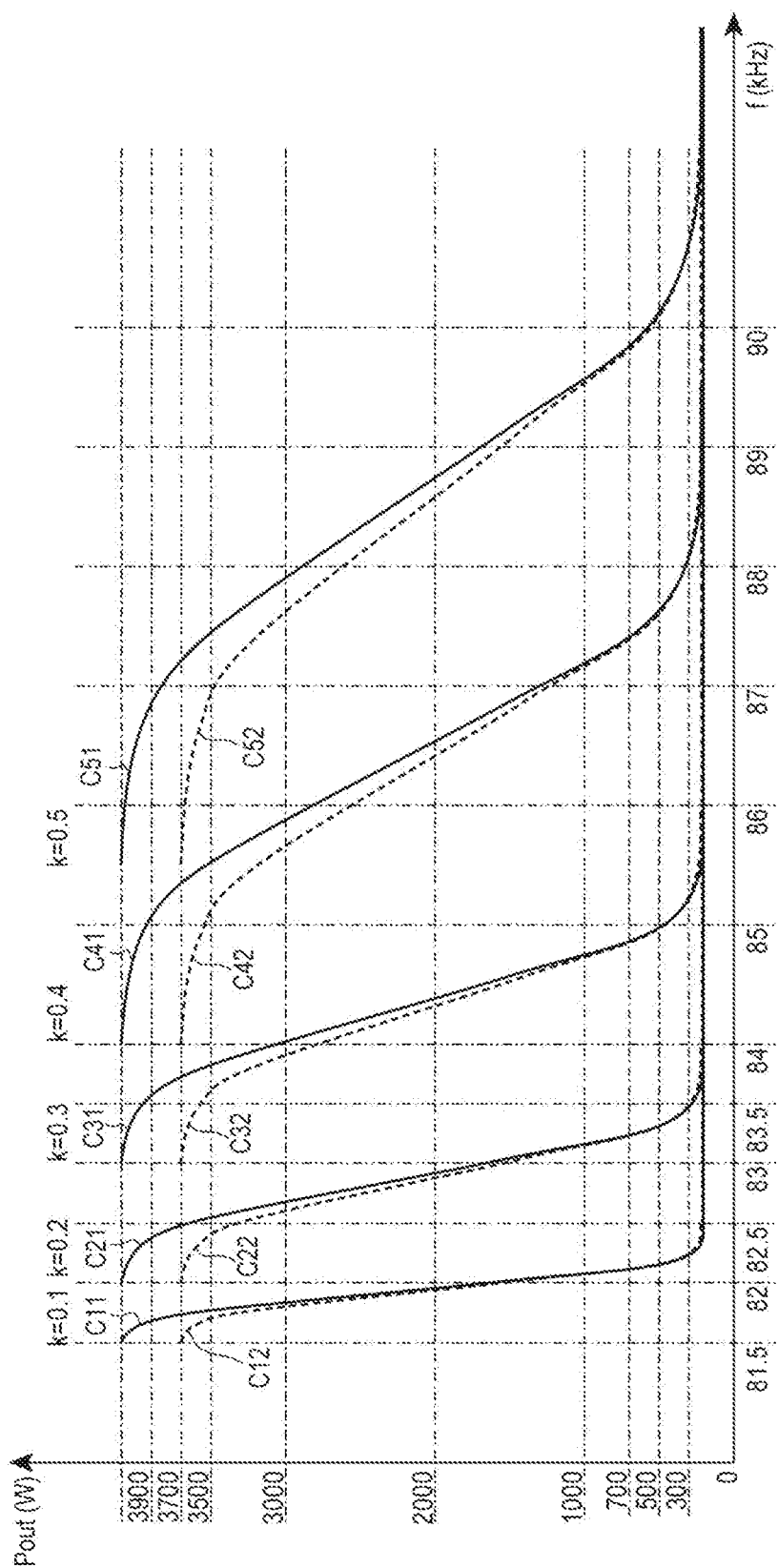
FIG. 12 is a diagram for explaining an example of a data table generation method.
Figure 13:
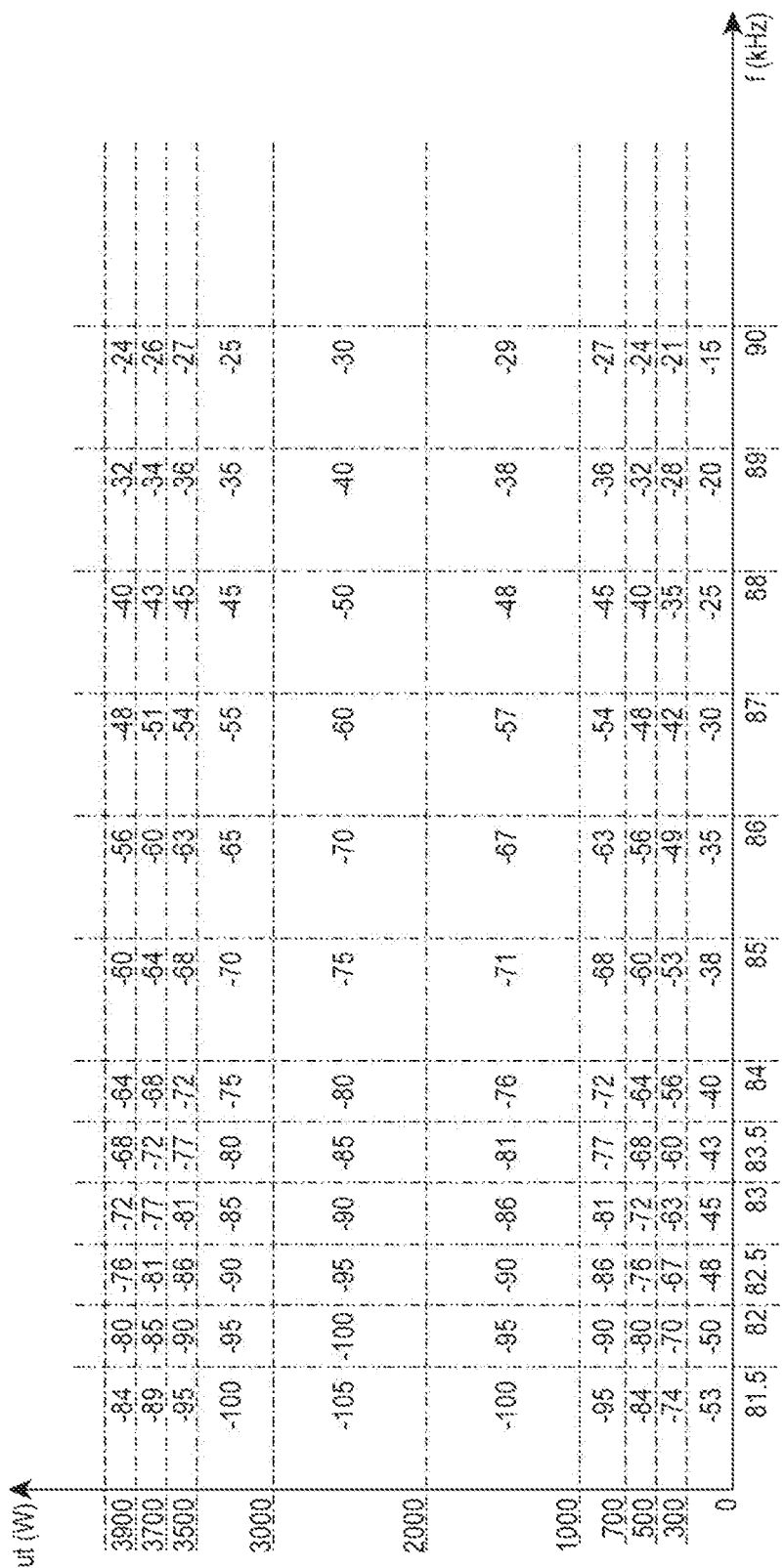
FIG. 13 is a diagram for explaining an example of a data table generation method.

Specifically, FIG. 13 illustrates an example of a data table when the voltage range of the load power Pout is a relatively high voltage range. This data table is generated on the basis of power characteristics shown by the curves C11, C21, C31, C41, and C51 in FIG. 12 and other curves not shown in FIG. 12. As illustrated in FIG. 13, the data table describes the load power change rate ΔP/Δf corresponding to each area determined by the predetermined range of the driving frequency f and the predetermined range of the load power Pout by numerical data.

In the data table illustrated in FIG. 13, a range of the driving frequency f is delimited by a two-dot chain line. A value corresponding to each range of the driving frequency f is a value indicating that the driving frequency f in the range does not become the value or more. For example, a range of the driving frequency f in which the driving frequency f is shown as "84" in the data table is a range of 83.5 kHz (that is, 84−0.5 kHz) or more and less than 84 kHz. In addition, a range of the driving frequency f in which the driving frequency f is shown as "85" in the data table is a range of 84 kHz or more and less than 85 kHz.

In addition, in the data table illustrated in FIG. 13, a range of the load power Pout is delimited by a one-dot chain line. A value corresponding to each range of the load power Pout is a lower limit value of the load power Pout in the range. For example, a range of the load power Pout in which the load power Pout is shown as "1000" in the data table is a range of 1000 W or more and less than 2000 W.

Figure 14:
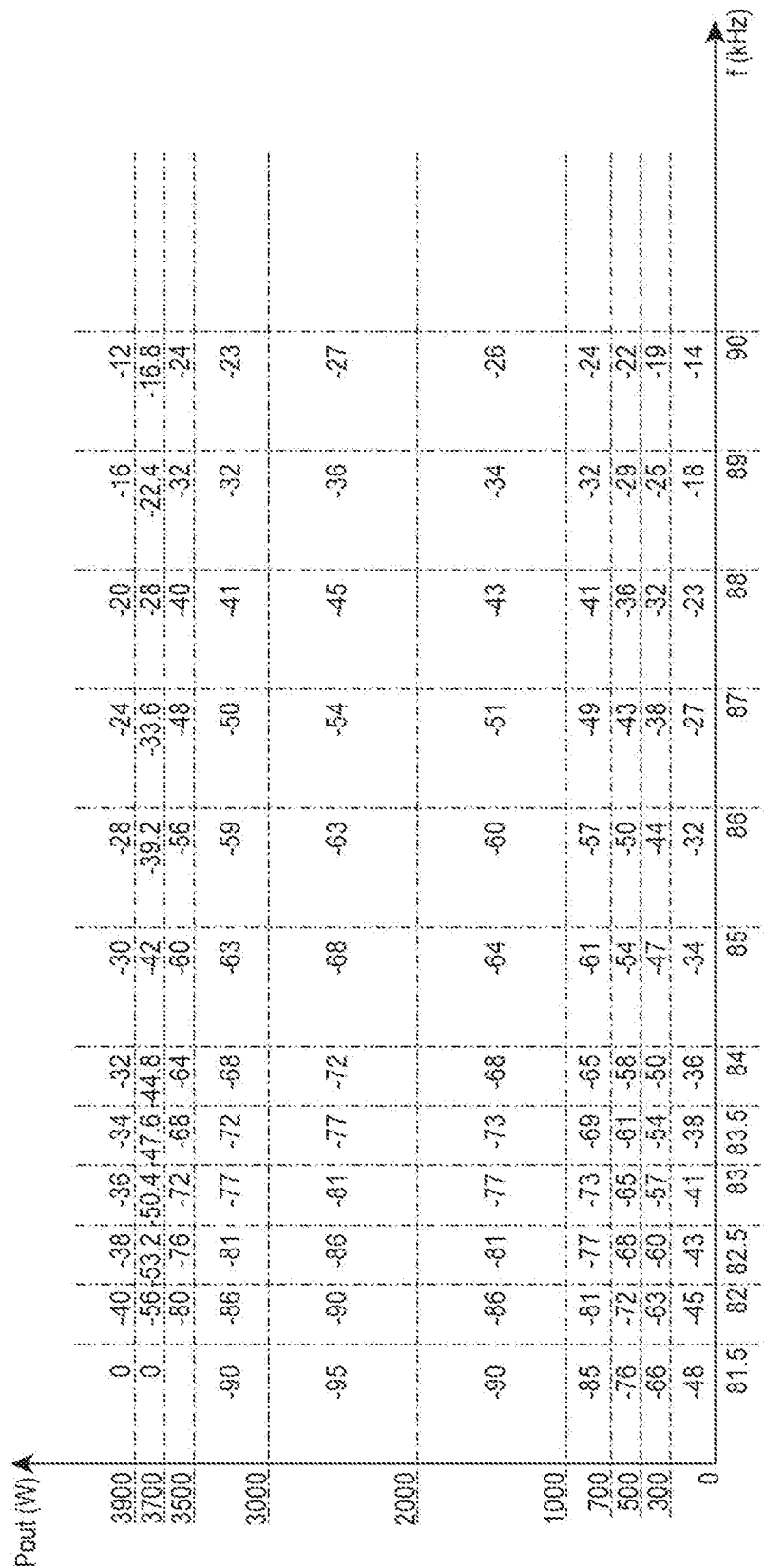
FIG. 14 is a diagram for explaining an example of a data table generation method.

FIG. 14 illustrates an example of a data table when the voltage range of the load power Pout is a relatively low voltage range. This data table is generated using power characteristics shown by the curves C12, C22, C32, C42, and C52 in FIG. 12 and other curves not illustrated in FIG. 12. The data table of FIG. 14 is different from the data table of FIG. 13 in that numerical data is different.

As such, it is possible to generate a data table describing different numerical data like the data table illustrated in FIG. 13 and the data table illustrated in FIG. 14, according to the voltage range of the load power Pout. In addition, because the numerical data corresponding to each area, that is, the load power change rate ΔP/Δf in the range of the driving frequency f and the range of the load power Pout is obtained by referring to the data table as illustrated in FIGS. 13 and 14, a change amount of the load power Pout when the driving frequency f is changed can be obtained.

Specifically, the data table illustrated in FIG. 14 is described as an example. Initially, it is assumed that the driving frequency f is 84.5 kHz and the load power Pout is 3300 W. An area in the data table corresponding to this is determined by a range in which the driving frequency f is shown as "85" and a range in which the load power Pout is shown as "3000". The load power change rate ΔP/Δf corresponding to this area is "−63". The load power change rate ΔP/Δf means that the magnitude of the load power Pout is changed by −63 W (decreased by 63 W) when the driving frequency f is increased by one step. For example, when desired power is 3000 W, it is necessary to decrease the load power Pout from 3300 W to 3000 W by 300 W. Therefore, a change amount ΔP of the load power Pout is −300 W.

Because a frequency control amount Δf of the driving frequency f to obtain the change amount ΔP of the load power Pout is Δf=(−300/−63), it is calculated as about +5 steps.

That is, in this case, it is possible to cause the load power Pout to approach the desired power 3000 W by increasing the driving frequency f by five steps by the frequency control.

On the other hand, initially, it is assumed that the driving frequency f is 83.3 kHz and the load power Pout is 500 W. An area in a data table corresponding to this is an area determined by a range in which the driving frequency f is shown as "83.5" and a range in which the load power Pout is shown as "500". A load power change rate ΔP/Δf corresponding to this area is "−61". For example, when the desired power is 3000 W, it is necessary to increase the load power Pout from 500 W to 3000 W by 2500 W. Therefore, a change amount ΔP of the load power Pout is +2500 W. Because a frequency control amount Δf of the driving frequency f to obtain the change amount ΔP of the load power Pout is Δf=(2500/−61), it is calculated as about −41 steps.

In other words, in this case, the driving frequency f is decreased by 41 steps by the frequency control, so that it is possible to cause the load power Pout to approach the desired power 3000 W.

However, the load power change rate ΔP/Δf "−61" referred to here is a most suitable value when the load power Pout is, for example, 500 W or more and less than 700 W. Therefore, when the load power Pout is adjusted such that the load power Pout becomes larger than 700 W, a value of the load power change rate ΔP/Δf "−61" is not necessarily an optimal value as a value indicating the load power change rate ΔP/Δf. In addition, it is not necessarily appropriate from a viewpoint of stability of control even if the value of the load power Pout to be adjusted at once is excessively large.

Therefore, for example, an upper limit of the number of steps when the driving frequency f is changed at once may be determined. For example, if an upper limit of an absolute value of the number of steps is set to 20, even in the case where the driving frequency f is increased by 41 steps as described above, an increase width thereof can be suppressed to 20 steps. After increasing the driving frequency f by 20 steps, the frequency control amount Δf may be calculated again on the basis of the corresponding load power change rate ΔP/Δf and the frequency control may be executed. By repeating such a control cycle, the load power Pout can be caused to approach the desired power.

Figure 15:
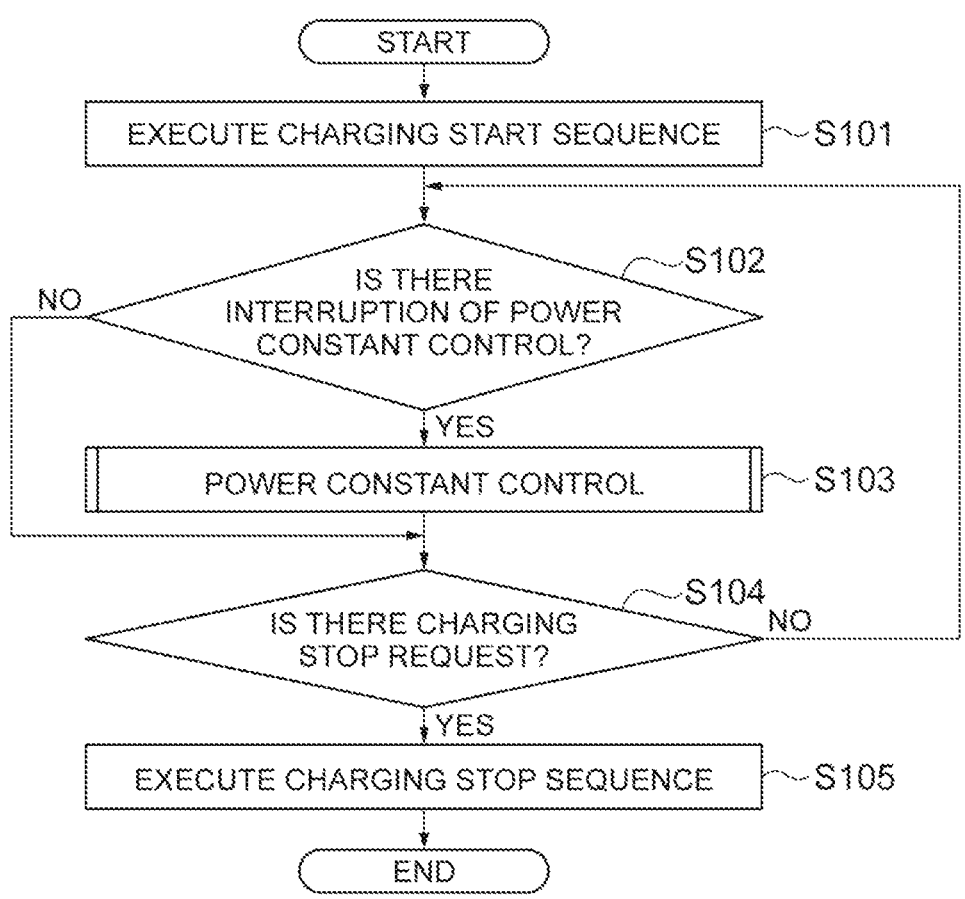
FIG. 15 is a flowchart illustrating an example of processing executed in a power transmitter according to a second embodiment.
Figure 16:
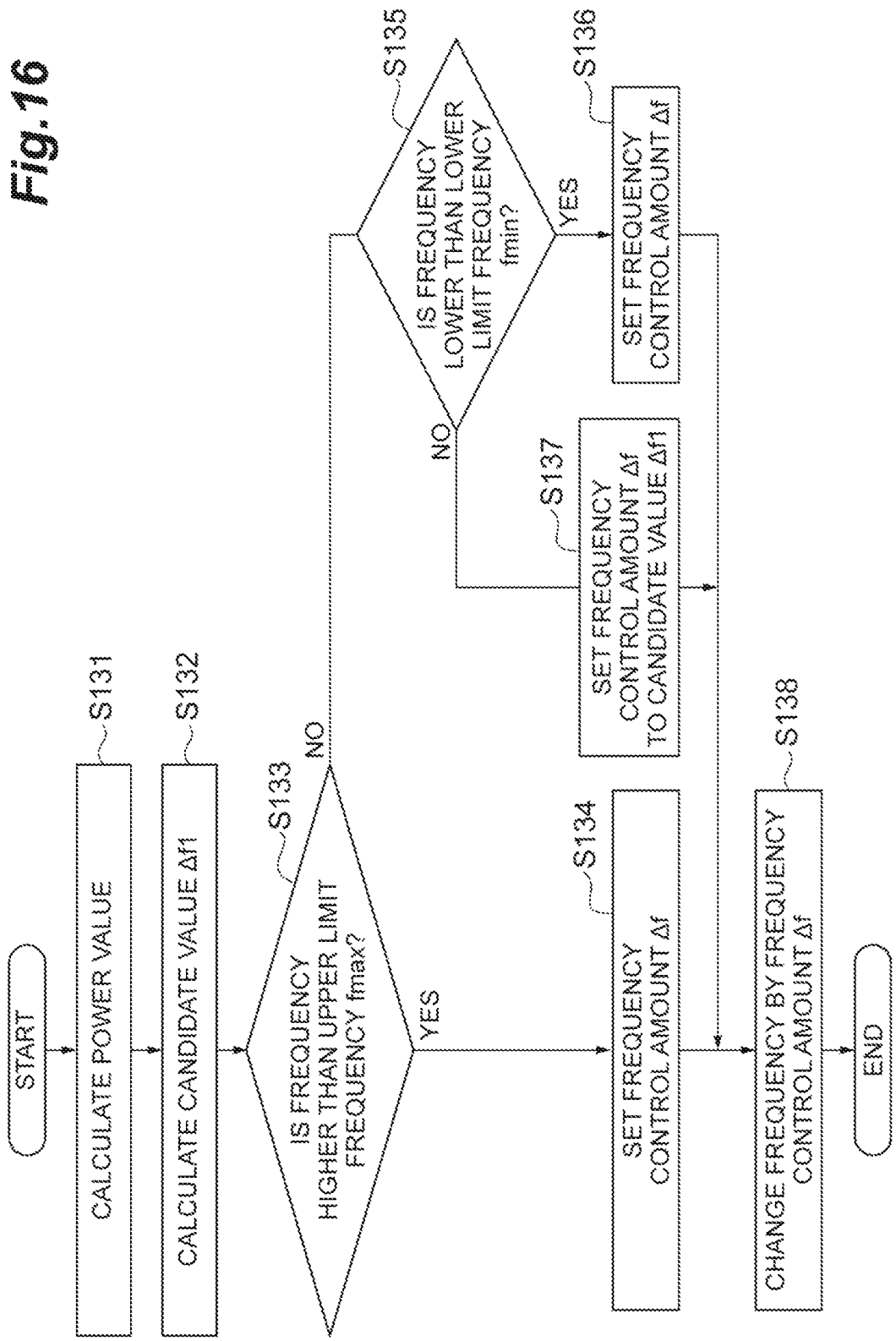
FIG. 16 is a flowchart illustrating an example of processing executed in the power transmitter according to the second embodiment.

Next, an operation of the power transmitter 2 according to the second embodiment is described with reference to FIGS. 15 and 16. FIGS. 15 and 16 are flowcharts illustrating an example of processing executed in the power transmitter 2 according to the second embodiment. Here, the case where the load L is a storage battery and the storage battery is charged with power from the power transmitter 2 is described as an example. The processing of the flowcharts starts, for example, when the power transmitter 2 receives a charging start request from the side of the power receiver 3.

First, the first controller 25 executes a charging start sequence (step S101). For example, at the driving frequency f at which impedance when viewing the side of the first coil 21 from a first converter 22 exhibits inductivity (not capacitive), the supply of the AC power Pac2 to the first coil 21 starts. In addition, the supply of the AC power Pac2 to the first coil 21 starts not to activate a protection function for preventing an excessive current from flowing through the first coil 21.

Next, the first controller 25 determines whether or not there is an interruption of power constant control (step S102). The power constant control is control to cause the desired power to be supplied to the load L and is realized by the power control described above. The interruption occurs at a predetermined cycle, for example. When it is determined that there is the interruption of the power constant control (YES in step S102), the first controller 25 performs the power constant control (step S103).

In the power constant control of step S103, as illustrated in FIG. 16, first, the first controller 25 calculates a power value based on a difference between a power command value and a power value of the load (that is, the magnitude of the load power Pout supplied to the load L) (step S131). The power command value shows the magnitude of the desired power to be supplied to the load L. Notification of the magnitude of the load power Pout supplied to the load L may be provided from the power receiver 3 to the power transmitter 2 as described above or the magnitude of the load power Pout may be estimated in the power transmitter 2 as described below.

Next, the first controller 25 refers to the data table and determines a candidate value Δf1 of a frequency control amount Δf (step S132). Specifically, as described above with reference to FIGS. 11 to 14, the data table is referred to and the frequency control amount Δf to cause the load power Pout to approach the desired power is calculated. However, the frequency control amount Δf in this case is a provisional value and can be changed in steps S134 and S136 to be described below. Therefore, what is determined in step S132 is the candidate value Δf1 of the frequency control amount Δf.

Next, the first controller 25 determines whether or not the frequency (driving frequency f) in the case of changing by the candidate value Δf1 is higher than an upper limit frequency f max (step S133). The upper limit frequency f max is an upper limit value of the driving frequency f. The upper limit frequency f max may be, for example, the upper limit value (for example, 90 kHz) of the driving frequency f usable by the wireless power transfer system 1 or may be an upper limit value of the driving frequency f at which the impedance when viewing the first coil 21 from the first converter 22 exhibits the inductivity. When it is determined that the driving frequency f in the case of changing by the candidate value Δf1 is higher than the upper limit frequency f max (YES in step S133), the first controller 25 sets the frequency control amount Δf such that the frequency becomes the upper limit frequency f max (step S134). As a result, it is possible to prevent the driving frequency f from exceeding the upper limit frequency f max.

On the other hand, when it is determined in step S133 that the driving frequency f in the case of changing by the candidate value Δf1 is the upper limit frequency f max or less (NO in step S133), the first controller 25 determines whether or not the driving frequency f in the case of changing by the candidate value Δf1 is lower than a lower limit frequency f min (step S135). The lower limit frequency f min is a lower limit value of the driving frequency f. For example, the lower limit frequency f min may be the lower limit value (for example, 81.38 kHz) of the driving frequency f usable by the wireless power transfer system 1 or may be a lower limit value of the driving frequency f at which the impedance when viewing the first coil 21 from the first converter 22 exhibits the inductivity. When it is determined that the driving frequency f in the case of changing by the candidate value Δf1 is lower than the lower limit frequency f min (YES in step S135), the first controller 25 sets the frequency control amount Δf such that the frequency becomes the lower limit frequency f min (step S136).

On the other hand, when it is determined in step S135 that the frequency in the case of changing by the candidate value Δf1 is the lower limit frequency min or more (NO in step S135), the first controller 25 sets the frequency control amount Δf to the candidate value Δf1 (step S137).

The frequency control amount Δf is determined in any one of steps S134, S136, and S137 described above. After the frequency control amount Δf is determined, the first controller 25 changes the frequency (driving frequency f) by the frequency control amount Δf (step S138).

When it is determined in previous step S102 that there is no interruption of the power constant control (NO in step S102) or after the frequency is changed by the frequency control amount Δf in step S138, the first controller 25 determines whether or not there is a charging stop request (step S104). Notification of the charging stop request is provided from the power receiver 3 to the power transmitter 2, for example, at timing when SOC of the load L functioning as the storage battery becomes sufficiently high and charging becomes unnecessary. When it is determined that there is no charging stop request (NO in step S104), the first controller 25 returns the processing to step S102 again. On the other hand, when it is determined that there is the charging stop request (YES in step S104), the first controller 25 executes a charging stop sequence (step S105).

According to the processing of FIGS. 15 and 16, the frequency control amount Δf of the driving frequency f is calculated and determined by the first controller 25 on the basis of the load power change rate ΔP/Δf, such that the desired power is supplied to the load L (steps S132, S134, S136, and S137), and the driving frequency f is changed (controlled) according to the determined frequency control amount Δf (step S138). According to the flowcharts, the power supplied to the load L is adjusted without detecting the misalignment between the first coil 21 and the second coil 31.

However, in the example of the processing illustrated in FIGS. 15 and 16, except for when there is a possibility that the driving frequency f exceeds the upper limit frequency f max (that is, YES in step S133) and when there is a possibility that the driving frequency f falls below the lower limit frequency f min (that is, YES in step S135), the frequency control amount Δf of the driving frequency f is set without distinction between the case of increasing the driving frequency f and the case of decreasing the driving frequency f (steps S131, S132, and S137).

Here, there is a possibility that the load power change rate ΔP/Δf considerably increases depending on a circuit characteristics of the wireless power transfer system 1 and the load power Pout rapidly increases only by slightly changing the driving frequency f. When the load power Pout rapidly increases, the power flowing through the power transmitter 2 and the power receiver 3 rapidly increases and it becomes difficult to stabilize the power control, for example. In addition, there is a possibility that deterioration and the like of various circuits (an inverter circuit, PFC, and the like) included in the first converter 22 and the second converter 32 are caused. To avoid this, when the load power Pout is increased, the frequency control amount Δf of the driving frequency f may be suppressed. On the other hand, when the load power Pout excessively increases due to the misalignment of the first coil 21 and the second coil 31 or some abnormal situation, the load power Pout should be quickly decreased.

Therefore, when the load power Pout is increased, the first controller 25 may correct the frequency control amount Δf such that the frequency control amount Δf becomes smaller than the calculated value and may execute the frequency control using (according to) the corrected frequency control amount Δf.

Specifically, it is described using a flowchart illustrated in FIG. 17. The flowchart illustrated in FIG. 17 is different from the flowchart illustrated in FIG. 16 in that steps S141, S142, and S143 are included between step S132 and steps S133 and S135 and flows between steps are different.

That is, as illustrated in FIG. 17, if the processing of step S132 is completed, the first controller 25 determines whether or not the candidate value Δf1 is a positive value (step S141). When it is determined that the candidate value Δf1 is the positive value (YES in step S141), the first controller 25 corrects the candidate value Δf1 with a coefficient A (step S142). This correction is correction to maintain the magnitude (that is, the absolute value) of the candidate value Δf1 to the magnitude of the candidate value Δf1 determined in previous step S132 or adjust the magnitude to a value larger than the magnitude of the candidate value Δf1. The first controller 25 corrects the candidate value Δf1 with the coefficient A by multiplying the candidate value Δf1 by the coefficient A, for example. In this case, the coefficient A is set to a value of 1 or more. After the processing of step S142 is completed, the first controller 25 advances the processing to step S133. When the candidate value Δf1 is zero and the coefficient A is 1, the candidate value Δf1 does not change depending on the correction by the coefficient A. Therefore, the processing of step S142 may be skipped.

On the other hand, when it is determined in step S141 that the candidate value Δf1 is zero or a negative value (NO in step S141), the first controller 25 corrects the candidate value Δf1 with a coefficient B (step S143). This correction is correction to adjust the magnitude (that is, the absolute value) of the candidate value Δf1 to a value smaller than the magnitude of the candidate value Δf1 determined in previous step S132. The first controller 25 corrects the candidate value Δf1 with the coefficient B by multiplying the candidate value Δf1 by the coefficient B, for example. In this case, the coefficient B is set to a value less than 1. After the processing of step S143 is completed, the first controller 25 advances the processing to step S135.

The processing of steps S133 and S135 is as described above with reference to FIG. 16. However, when the candidate value Δf1 is the positive value (YES in step S141), the driving frequency f does not fall below the lower limit frequency f min. When the candidate value Δf1 is not the positive value (NO in step S141), the driving frequency f does not exceed the upper limit frequency f max. Therefore, when the candidate value Δf1 is positive (YES in step S141), after the processing of step S142, the processing of step S133 is executed, that is, it is determined whether or not the driving frequency f in the case of changing by the candidate value Δf1 is higher than the upper limit frequency f max, and the processing proceeds to step S134 or step S137 according to a determination result thereof. When the candidate value Δf1 is not the positive value (NO in step S141), after the processing of step S143, the processing of step S135 is executed, that is, it is determined whether or not the driving frequency f in the case of changing by the candidate value Δf1 is lower than the lower limit frequency f min, and the processing proceeds to step S136 or step S137 according to a determination result thereof. The processing from steps S134, S136, and S137 is as described above with reference to FIGS. 15 and 16.

According to the processing of FIG. 17, when the load power Pout is increased, that is, when the driving frequency f is decreased (NO in step S141), correction is performed such that the magnitude of the frequency control amount $\Delta f$ is smaller than the magnitude of the calculated value (step S143). Therefore, the power supplied to the load L and the power flowing through the power transmitter 2 and the power receiver 3 are suppressed from rapidly increasing, by the frequency control. On the other hand, when the load power Pout is decreased, that is, when the driving frequency f is increased (YES in step S141), the magnitude of the frequency control amount $\Delta f$ is equal to or larger than the magnitude of the calculated value (step S142). Therefore, the load power Pout is quickly decreased.

Next, a function and an effect of the first controller 25 are described. For example, the first controller 25 adopts the driving frequency f as a parameter for controlling the AC power Pac2 supplied to the first coil 21 and changes the driving frequency f. As a result, the driving frequency f is changed such that the load power Pout supplied to the load L is caused to approach the desired power (power command value).

In the embodiments, the driving frequency f is changed (the frequency control is executed) such that the power supplied to the load L approaches the desired power, on the basis of the change amount (load power change rate $\Delta P/\Delta f$) of the load power with respect to the predetermined frequency change amount of the driving frequency f from the reference frequency. Specifically, the first controller 25 changes the driving frequency f, on the basis of the difference (the change amount $\Delta P$ of the load power Pout) between the load power Pout supplied to the load L and the desired power (power command value) and the load power change rate $\Delta P/\Delta f$. More specifically, the frequency control amount $\Delta f$ of the driving frequency f is calculated by dividing the difference (change amount $\Delta P$ of the load power Pout) by the load power change rate $\Delta P/\Delta f$. In addition, the driving frequency f is changed (controlled) using the calculated frequency control amount $\Delta f$, so that the load power Pout supplied to the load L can be caused to approach the desired power. As such, the frequency control is executed on the basis of the load power change rate $\Delta P/\Delta f$, so that it is possible to adjust the load power Pout supplied to the load L without detecting the misalignment between the first coil 21 and the second coil 31.

In addition, in the embodiments, the storage unit of the first controller 25 stores the load power change rate $\Delta P/\Delta f$. As described with reference to FIGS. 11 to 14, the data table is generated in advance and the first controller 25 stores the data table. The first controller 25 executes the frequency control by referring to the data table. That is, it is not necessary to calculate the load power change rate $\Delta P/\Delta f$ in real time. Therefore, the processing time is shortened and the load power Pout supplied to the load L can be efficiently caused to approach the desired power. In particular, even if the misalignment occurs during power feeding and the load power Pout supplied to the load L is different from the desired power, the load power Pout supplied to the load L can be caused quickly to approach the desired power. That is, power control with good responsiveness is realized.

The first controller 25 may acquire the load power change rate $\Delta P/\Delta f$ from the outside of the power transmitter 2. For example, the load power change rate $\Delta P/\Delta f$ is acquired by receiving the load power change rate $\Delta P/\Delta f$ transmitted from other device (for example, a movable object such as a vehicle) provided with the power receiver 3. In this case, because the movable object such as the vehicle transmitting the load power change rate $\Delta P/\Delta f$ identifies the characteristic of the power receiver 3, the load power change rate $\Delta P/\Delta f$ corresponding to the power receiver 3 is acquired. As a result, the load power Pout is adjusted on the basis of an appropriate load power change rate $\Delta P/\Delta f$. Therefore, even when power is supplied to the power receivers 3 having different types and characteristics, it is possible to appropriately adjust the load power Pout.

In addition, the graphs illustrated in FIGS. 11 and 12 of the embodiment show a plurality of curves showing the relation between the driving frequency f and the load power Pout for each of the plurality of different coupling coefficients k. In addition, the data tables illustrated in FIGS. 13 and 14 are generated on the basis of all curves corresponding to the plurality of different coupling coefficients k. Therefore, even if the value of the coupling coefficient k changes to any value due to the misalignment between the first coil 21 and the second coil 31, the load power change rate $\Delta P/\Delta f$ corresponding to the coupling coefficient k (that is, the state of misalignment) is described by the data table. In this case, by referring to the data tables illustrated in FIGS. 13 and 14, the frequency control can be executed on the basis of the load power change rate $\Delta P/\Delta f$ described by the data table, regardless of the state of the misalignment. Therefore, it is possible to execute the frequency control to cause the power supplied to the load L to approach the desired power, without detecting the misalignment.

In the frequency control described above, the frequency control amount $\Delta f$ of the driving frequency f is calculated as a value that eliminates the difference between the desired power and the load power Pout. Therefore, it is expected that the load power Pout becomes substantially the same value as or a value close to the desired power, by changing the driving frequency f by the frequency control amount $\Delta f$. As a result, there is a high possibility that the load power Pout can be caused to approach the desired power in a short time.

Here, as described above, to identify the load power Pout supplied to the load L provided on the side of the power receiver 3, notification of the magnitude of the load power Pout and the power command value may be provided from the power receiver 3 to the power transmitter 2. In this case, the power control is performed on the basis of the load power Pout directly detected by the second detector 33 of the power receiver 3. Therefore, accuracy of the power control can be improved as compared with the case where the load power Pout supplied to the load L is estimated on the basis of the AC power Pac2 supplied to the first coil 21, for example.

In addition, as described above with reference to FIGS. 11 to 14, the load power change rate $\Delta P/\Delta f$ is set for each different reference frequency. Therefore, the first controller 25 can change (control) the driving frequency f, on the basis of the load power change rate $\Delta P/\Delta f$ with the driving frequency f of the AC power Pac2 supplied to the first coil 21 as the reference frequency. As a result, even when the load power change rate $\Delta P/\Delta f$ is different according to the reference frequency, the power control based on the appropriate load power change rate $\Delta P/\Delta f$ corresponding to the driving frequency f of the AC power Pac2 supplied to the first coil 21 is enabled. Therefore, accuracy of the power control can be improved.

Here, the interval between the different reference frequencies may be set to be larger when the change amount of the load power change rate $\Delta P/\Delta f$ with respect to the driving frequency f is smaller. For example, if the individual reference frequencies are set at equal intervals at frequency intervals at which an appropriate resolution with respect to the change amount of the load power change rate $\Delta P/\Delta f$ is obtained with a region where the change amount of the load power change rate $\Delta P/\Delta f$ is large as a reference, the resolution with respect to the load power change rate $\Delta P/\Delta f$ becomes excessively fine in a region where the change amount of the load power change rate $\Delta P/\Delta f$ is small. In this case, because the number of reference frequencies, that is, the number of corresponding load power change rates $\Delta P/\Delta f$ becomes excessively large, an amount of data to be handled becomes unnecessarily large correspondingly. On the other hand, if the individual reference frequencies are set at equal intervals at frequency intervals at which an appropriate resolution with respect to the change amount of the load power change rate $\Delta P/\Delta f$ is obtained with a region where the change amount of the load power change rate $\Delta P/\Delta f$ is small as a reference, the resolution with respect to the load power change rate $\Delta P/\Delta f$ becomes coarse in a region where the change amount of the load power change rate $\Delta P/\Delta f$ is large. In this case, there is a possibility that adjustment accuracy of the power cannot be sufficiently improved. According to the above configuration, the interval between the adjacent reference frequencies is set to be larger when the change amount of the load power change rate $\Delta P/\Delta f$ is smaller. Therefore, in the region where the change amount of the load power change rate $\Delta P/\Delta f$ is small, the frequency interval is set such that the resolution with respect to the change amount of the load power change rate $\Delta P/\Delta f$ does not become excessively fine, and the data amount is suppressed. In addition, in the region where the change amount of the load power change rate $\Delta P/\Delta f$ is large, the frequency interval is set such that the resolution with respect to the change amount of the load power change rate $\Delta P/\Delta f$ does not become excessively coarse. Therefore, it is possible to maintain the adjustment accuracy of the load power Pout while reducing the amount of data to be handled.

In addition, as described above with reference to FIGS. 11 to 14, the load power change rate $\Delta P/\Delta f$ is set for each different voltage range of the load power Pout supplied to the load L. Therefore, for example, even when the load L is the storage battery or the like and the load power change rate $\Delta P/\Delta f$ is different according to the voltage range of the load power Pout supplied to the load L, the power control based on the appropriate load power change rate $\Delta P/\Delta f$ corresponding to the voltage of the load power Pout is enabled. Therefore, accuracy of the power control can be improved.

The first controller 25 calculates the candidate value $\Delta f1$ of the frequency control amount $\Delta f$, on the basis of the change amount $\Delta P$ of the load power Pout and the load power change rate $\Delta P/\Delta f$. The change amount $\Delta P$ of the load power Pout is the difference between the load power Pout supplied to the load L and the desired power (power command value). Here, as described above with reference to FIG. 17, when the load power Pout supplied to the load L is increased, the first controller 25 may perform correction such that the magnitude of the calculated candidate value $\Delta f1$ decreases, may set the corrected candidate value $\Delta f1$ as the frequency control amount $\Delta f$, and change the driving frequency f by the frequency control amount $\Delta f$. As a result, it is possible to suppress occurrence of a situation where the load power Pout supplied to the load L and the power flowing through the power transmitter 2 or the like rapidly increase and it becomes difficult to realize the stabilized power control, for example.

However, even if notification of the magnitude of the load power Pout is not provided from the power receiver 3 to the power transmitter 2 as described above, the first controller 25 can identify the load power Pout supplied to the load L. For example, the first controller 25 may estimate the load power Pout, on the basis of the AC power Pac2 supplied from the first converter 22 to the first coil 21. This is because the AC power Pac2 and the load power Pout are associated with each other. For example, when power loss rarely occurs in the power transmission by the wireless power transfer system 1, the magnitudes of the AC power Pac2 and the load power Pout are substantially the same. Therefore, the magnitude of the AC power Pac2 supplied to the first coil 21 can be estimated as the load power Pout supplied to the load L. In addition, when the power loss is considered, the magnitude of the power loss is set to a predetermined value (for example, 5%) and a value obtained by subtracting the magnitude of the power loss from the magnitude of the AC power Pac2 can be estimated as the load power Pout. As such, the load power Pout supplied to the load L is estimated on the basis of the AC power Pac2 supplied to the first coil 21, so that it is possible to eliminate necessity of the notification of the load power Pout from the power receiver 3 to the power transmitter 2, for example. In this case, there is a high possibility that the configuration of the power transmitter 2 and the power receiver 3, that is, the wireless power transfer system 1 can be simplified and the cost can be reduced.

Although the second embodiment of the present disclosure has been described above, the present invention is not limited to the above embodiment. For example, in the second embodiment, the case where the frequency control is used as the power control has been mainly described. However, the phase shift control and the control of the DC power Pdc may be adopted as the power control.

When the phase shift control is used as the power control, a shift amount of the driving times of the switching elements included in the inverter circuit, which has been described above with reference to FIG. 3, may be adopted as the parameter for controlling the AC power Pac2 supplied to the first coil 21. In this case, the power change rate is a change amount of the load power Pout with respect to a change amount of the shift amount of the driving times. A data table describing the power change rate can be generated using the same method as the case of the frequency control.

In addition, when the control of the DC power Pdc is used as the power control, the magnitude of the voltage Vdc of the DC power Pdc may be adopted as the parameter for controlling the AC power Pac2 supplied to the first coil 21. In this case, the power change rate is a change amount of the load power Pout with respect to a change amount of the magnitude of the voltage Vdc of the DC power Pdc. A data table describing the power change rate can also be generated using the same method as the case of the frequency control.

In addition, control of the impedance of the wireless power transfer system 1 may be adopted as the power control. If the impedance of the elements configuring the power transmitter 2 of the wireless power transfer system 1 changes, the impedance of the wireless power transfer system 1 changes and the AC power Pac2 supplied by the first converter 22 also changes. That is, the impedance of the wireless power transfer system 1 may be adopted as the parameter for controlling the AC power Pac2 supplied to the first coil 21. For example, at least one of the first coil 21 and a capacitor or an inductance that can be connected to the first coil 21 is realized by a variable element and impedance of the variable element is changed, so that impedance of the wireless power transfer system 1 changes. In this case, the power change rate is a change amount of the load power Pout with respect to a change amount of the impedance of the variable element. A data table describing the power change rate can also be generated using the same method as the case of the frequency control.

In addition, in the second embodiment, the case where the power (load power) supplied to the load L is caused to approach the desired power on the basis of the power change rate has been described. However, the power change rate may define the change in the current. When the voltage (load voltage) applied to the load L does not change (or the change thereof is extremely small), the load power is proportional (substantially proportional) to the current (load current) supplied to the load L. By dividing the desired power by the load voltage, a desired current for realizing the desired power is obtained. In this case, the power change rate is set as a change amount of the load current with respect to the change amount of the driving frequency f (or the shift amount of the driving times in the phase shift, the magnitude of the voltage Vdc of the DC power Pdc, and the impedance of the variable element). The load current is caused to approach the desired current on the basis of the power change rate, so that the load power can be caused to approach the desired power.

REFERENCE SIGNS LIST 1 wireless power transfer system
2 power transmitter
3 power receiver
21 first coil
22 first converter
23 first detector
24 first communication device
25 first controller
26 power converter
27 DC/AC converter
31 second coil
32 second converter
33 second detector
34 second communication device
35 second controller
PS power source
L load

The invention claimed is:

1. A power transmitter for supplying power to a power receiver connected to a load, the power transmitter comprising:
a first coil configured to wirelessly transmit the power to a second coil of the power receiver;
a converter configured to receive direct current (DC) power, convert the DC power into alternating current (AC) power, and supply the AC power to the first coil; and
a controller configured to execute power control for causing power supplied to the load to approach desired power,
wherein the controller executes frequency control of the AC power and at least one control of phase shift control of the converter and voltage control of the DC power as the power control,
when the power supplied to the load cannot be caused to approach the desired power by the frequency control, the controller executes at least one of the phase shift control and the voltage control, and when a difference between a power command value corresponding to the desired power and the power supplied to the load is larger than a predetermined error allowance value, the controller determines that the power supplied to the load cannot be caused to approach the desired power.

2. The power transmitter according to claim 1, wherein the controller executes the frequency control and the phase shift control as the power control, and
the controller executes the phase shift control when the power supplied to the load cannot be caused to approach the desired power by the frequency control.

3. The power transmitter according to claim 2, wherein the controller further executes the voltage control, and
the controller further executes the voltage control when the power supplied to the load cannot be caused to approach the desired power by the phase shift control.

4. The power transmitter according to claim 1, wherein the controller further switches a voltage of the DC power according to a power command value corresponding to the desired power.

5. A power transmitter for supplying power to a power receiver connected to a load, the power transmitter comprising:
a first coil configured to wirelessly transmit the power to a second coil of the power receiver;
a converter configured to receive direct current (DC) power, convert the DC power into alternating current (AC) power, and supply the AC power to the first coil; and
a controller configured to execute power control for causing power supplied to the load to approach desired power,
wherein:
the controller executes frequency control of the AC power and at least one control of phase shift control of the converter and voltage control of the DC power as the power control,
when the power supplied to the load cannot be caused to approach the desired power by the frequency control, the controller executes at least one of the phase shift control and the voltage control,
a current phase of the AC power is more delayed than a voltage phase of the AC power, and
the controller executes the power control such that the magnitude of a phase difference of the current phase with respect to the voltage phase does not fall below a predetermined value in the phase shift control.

6. A wireless power transfer system comprising:
the power transmitter according to claim 1; and
the power receiver configured to perform communication with the power transmitter,
wherein the power receiver includes a detector configured to detect power supplied to the load, and
the controller executes the power control such that the power detected by the detector approaches the desired power.

7. A power transmitter for supplying power to a power receiver connected to a load, the power transmitter comprising:
a first coil configured to wirelessly transmit the power to a second coil of the power receiver;
a converter configured to receive power, convert the power into alternating current (AC) power, and supply the converted AC power to the first coil; and
a controller configured to change a parameter for controlling the AC power, wherein:

the controller changes the parameter such that power supplied to the load approaches desired power, based on a power change rate indicating a change amount of the power supplied to the load with respect to a predetermined change amount of the parameter from a reference value, the parameter is a frequency of the AC power, the reference value is a reference frequency determined with respect to the frequency of the AC power, the power change rate is set for each of the different reference frequencies, the controller changes the frequency of the AC power such that the power supplied to the load approaches the desired power, based on the power change rate with the frequency of the AC power supplied to the first coil as the reference frequency, and when the different reference frequencies are arranged in ascending order or descending order, an interval between the adjacent reference frequencies is set to be larger when a change amount of the power change rate with respect to the frequency of the AC power is smaller.

8. The power transmitter according to claim 7, wherein the controller stores the power change rate.

9. The power transmitter according to claim 7, wherein the controller acquires the power change rate from the outside of the power transmitter.

10. The power transmitter according to claim 7, wherein the controller changes the parameter based on a difference between the power supplied to the load and the desired power and the power change rate.

11. The power transmitter according to claim 7, wherein the power change rate is set for each different voltage range of the power supplied to the load, and the controller changes the parameter such that the power supplied to the load approaches the desired power, based on a power change rate corresponding to a voltage range including a voltage of the power supplied to the load.

12. The power transmitter according to claim 7, wherein the controller calculates a control amount of the parameter, based on a difference between the power supplied to the load and the desired power and the power change rate, and when the power supplied to the load is increased, the controller performs correction such that the magnitude of the calculated control amount of the parameter decreases and changes the parameter by the control amount of the parameter after the correction.

13. The power transmitter according to claim 7, wherein the controller estimates the power supplied to the load based on the AC power and changes the parameter such that the estimated power approaches the desired power.

14. A wireless power transfer system comprising:

the power transmitter according to claim 7; and the power receiver, wherein the power receiver performs communication with the power transmitter, the power receiver includes a detector configured to detect the power supplied to the load, and the controller changes the parameter such that the power detected by the detector approaches the desired power.

15. The power transmitter according to claim 7, wherein the power change rate is a ratio $\Delta P/\Delta f$ where $\Delta P$ is a change amount of power and $\Delta f$ is a change amount of frequency with respect to the power.

16. The power transmitter according to claim 5, wherein the controller executes the frequency control and the phase shift control as the power control, and the controller executes the phase shift control when the power supplied to the load cannot be caused to approach the desired power by the frequency control.

17. The power transmitter according to claim 5, wherein the controller further executes the voltage control, and the controller further executes the voltage control when the power supplied to the load cannot be caused to approach the desired power by the phase shift control.

18. The power transmitter according to claim 5, wherein the controller further switches a voltage of the DC power according to a power command value corresponding to the desired power.

19. A wireless power transfer system comprising:

the power transmitter according to claim 5; and the power receiver configured to perform communication with the power transmitter, wherein the power receiver includes a detector configured to detect power supplied to the load, and the controller executes the power control such that the power detected by the detector approaches the desired power.

* * * * *